United States Patent
Kimura

(10) Patent No.: US 9,380,236 B2
(45) Date of Patent: Jun. 28, 2016

(54) IMAGING SENSOR, IMAGING APPARATUS, ELECTRONIC DEVICE, AND IMAGING METHOD

(71) Applicant: Sony Corporation, Tokyo (JP)

(72) Inventor: Yasutaka Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/858,363

(22) Filed: Sep. 18, 2015

(65) Prior Publication Data

US 2016/0006962 A1    Jan. 7, 2016

Related U.S. Application Data

(63) Continuation of application No. 14/551,411, filed on Nov. 24, 2014, now Pat. No. 9,215,387, which is a continuation of application No. 13/722,463, filed on Dec. 20, 2012, now Pat. No. 8,908,076.

(30) Foreign Application Priority Data

Jan. 12, 2012   (JP) ................................. 2012-003997

(51) Int. Cl.
| | |
|---|---|
| *H04N 5/374* | (2011.01) |
| *H04N 5/235* | (2006.01) |
| *H04N 5/369* | (2011.01) |
| *H04N 5/355* | (2011.01) |
| *H04N 5/353* | (2011.01) |
| *H04N 9/04* | (2006.01) |

(52) U.S. Cl.
CPC .......... *H04N 5/3692* (2013.01); *H04N 5/2353* (2013.01); *H04N 5/3535* (2013.01); *H04N 5/35563* (2013.01); *H04N 5/35581* (2013.01); *H04N 5/374* (2013.01); *H04N 5/3742* (2013.01); *H04N 9/045* (2013.01)

(58) Field of Classification Search
CPC ... H04N 5/3692; H04N 5/3742; H04N 5/374; H04N 5/35581; H04N 5/3535; H04N 5/35563; H04N 5/2353; H04N 9/045
USPC ......................................................... 348/296
See application file for complete search history.

(56) References Cited

U.S. PATENT DOCUMENTS

| | | | | |
|---|---|---|---|---|
| 9,007,505 | B2 * | 4/2015 | Ichikawa | ............... H04N 5/365 250/208.1 |
| 2007/0285526 | A1 | 12/2007 | Mann et al. | |
| 2009/0195683 | A1 | 8/2009 | Honda et al. | |
| 2009/0219420 | A1 * | 9/2009 | Kuroda | .................. H04N 5/343 348/281 |
| 2009/0290052 | A1 | 11/2009 | Liu et al. | |
| 2010/0079611 | A1 * | 4/2010 | Suzuki | .................. H04N 5/374 348/222.1 |
| 2012/0019698 | A1 | 1/2012 | Ui et al. | |
| 2014/0027613 | A1 | 1/2014 | Smith | |

FOREIGN PATENT DOCUMENTS

JP     2010-062785     3/2010

* cited by examiner

*Primary Examiner* — Gevell Selby
(74) *Attorney, Agent, or Firm* — Wolf, Greenfield & Sacks, P.C.

(57) ABSTRACT

There is provided an image sensor including at least three pixel transfer control signal lines, on a per line basis, configured to control exposure start and end timings of a pixel in order for exposure timings of a plurality of the pixels constituting one line in a specific direction to have at least three patterns.

3 Claims, 23 Drawing Sheets

| $R_L$ | $G_L$ | $R_S$ | $G_L$ | $R_L$ | $G_L$ | $R_S$ | $G_L$ |
|---|---|---|---|---|---|---|---|
| $G_S$ | $B_L$ | $G_S$ | 202 $B_S$ | $G_S$ | $B_L$ | $G_S$ | $B_S$ |
| $R_S$ | 201 $G_L$ | $R_L$ | $G_L$ | $R_S$ | 203 $G_L$ | $R_L$ | $G_L$ |
| $G_S$ | $B_S$ | $G_S$ | $B_L$ | $G_S$ | $B_S$ | $G_S$ | $B_L$ |
| $R_L$ | $G_L$ 204 | $R_S$ 205 | $G_L$ 206 | $R_L$ | $G_L$ | $R_S$ | $G_L$ |
| $G_S$ | $B_L$ | $G_S$ | $B_S$ | $G_S$ | $B_L$ | $G_S$ | $B_S$ |
| $R_S$ | $G_L$ | $R_L$ | $G_L$ | $R_S$ | $G_L$ | $R_L$ | $G_L$ |
| $G_S$ | $B_S$ | $G_S$ | $B_L$ | $G_S$ | $B_S$ | $G_S$ | $B_L$ |

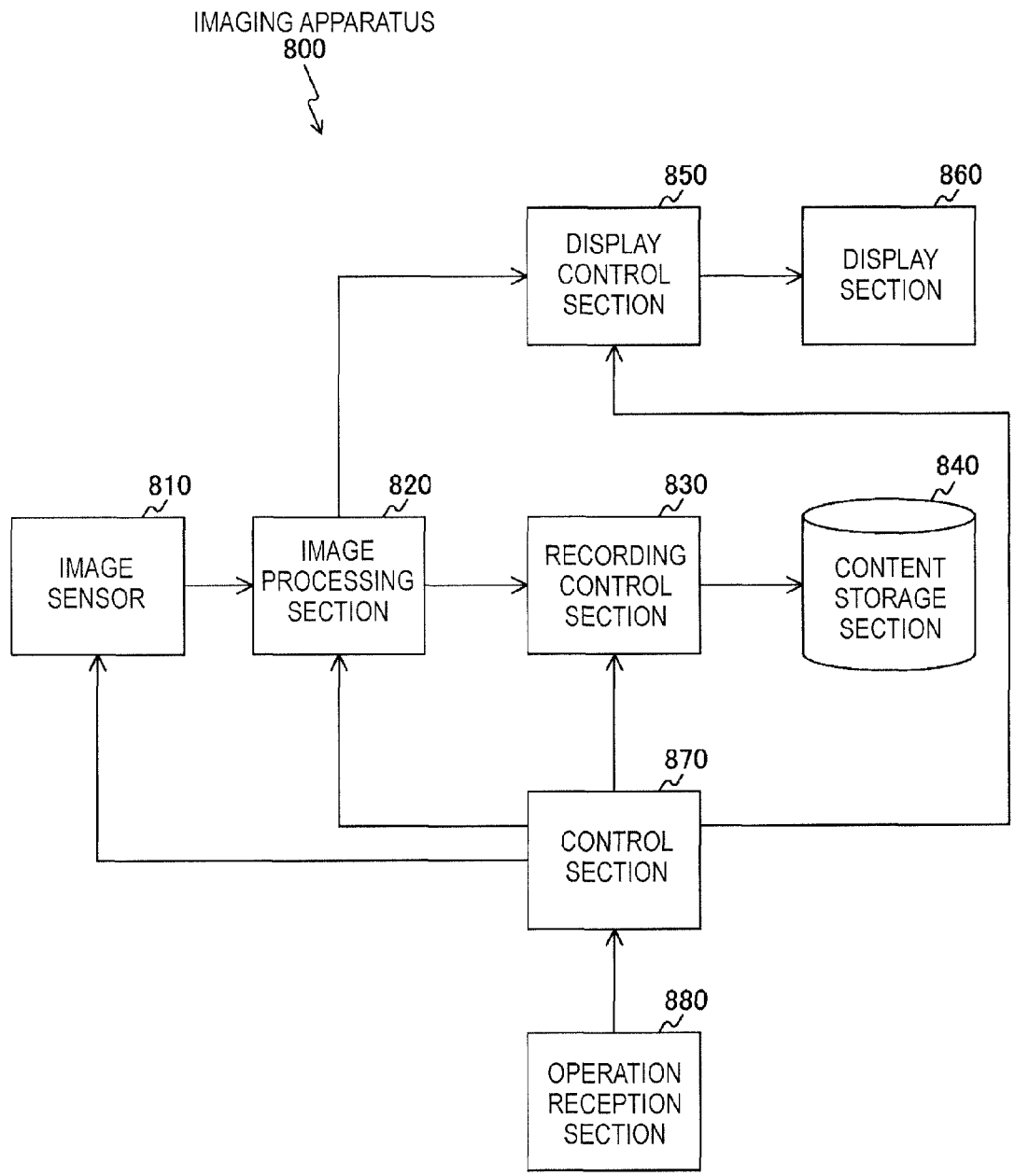

IMAGING SENSOR, IMAGING APPARATUS, ELECTRONIC DEVICE, AND IMAGING METHOD

CROSS REFERENCES TO RELATED APPLICATIONS

This is a Continuation Application of U.S. patent application Ser. No. 14/551,411, filed Nov. 24, 2014, which is a Continuation Application of U.S. patent application Ser. No. 13/722,463, filed Dec. 20, 2012, Issued as U.S. Pat. No. 8,908,076 on Dec. 9, 2014, which in turn claims priority from Japanese Application No.: 2012-003997, filed on Jan. 12, 2012, the entire contents of which are incorporated herein by reference.

BACKGROUND

The present technology relates to an image sensor. More particularly, the present technology relates to an image sensor that reads from a plurality of pixels at a plurality of exposure timings, an imaging apparatus and electronic device having the image sensor, and an imaging method for use in the image sensor, the imaging apparatus and the electronic device.

Recently, electronic device (for example, an imaging apparatus such as a digital still camera) that generates an image (image data) by imaging an object such as a human and records the generated image (image data) as image content (an image file) has become widespread. As an image sensor for use in the electronic device, a charge coupled device (CCD) sensor, a complementary metal oxide semiconductor (CMOS) sensor, and the like have become widespread.

For example, an image sensor in which a pixel for generating a long-time-exposure image and a pixel for generating a short-time-exposure image are arranged adjacent to each other on an imaging surface has been proposed (for example, see Japanese Patent Application Publication No. 2010-62785).

SUMMARY

A high-dynamic-range image of which camera blur has been appropriately corrected can be generated in the above-described related art.

As described above, in the above-described related art, the appropriately corrected image can be generated. However, pixel size reduction has recently progressed. Thus, it is important to perform appropriate imaging control to cope with the pixel size reduction and generate an appropriate image corresponding to the pixel size reduction.

It is desirable to perform appropriate imaging control.

The present technology is provided to solve the above-mentioned issues. According to a first embodiment of the present technology, there is provided an image sensor and an imaging method thereof including at least three pixel transfer control signal lines configured to control exposure start and end timings of each pixel on a per line basis so that exposure timings of a plurality of pixels constituting one line in a specific direction have at least three patterns. Thereby, there is an effect that the exposure timings of the plurality of pixels constituting the one line in the specific direction have the at least three patterns by controlling the exposure start and end timings of each pixel.

Further, according to the first embodiment of the present technology, A first line on which a pixel of first spectral sensitivity and a pixel of second spectral sensitivity constituting the plurality of pixels are alternately arranged in the specific direction and a second line on which a pixel of the first spectral sensitivity and a pixel of third spectral sensitivity constituting the plurality of pixels are alternately arranged in the specific direction may be alternately arranged in an orthogonal direction orthogonal to the specific direction. Thereby, there is an effect that the exposure timings of the plurality of pixels constituting the one line in the specific direction have the at least three patterns in the image sensor in which the first and second lines are alternately arranged in the orthogonal direction.

Further, according to the first embodiment of the present technology, using at least two pixel transfer control signal lines of the pixel transfer control signal lines in the first line, some pixels constituting the first line may be designated as first pixels for generating a long-time-exposure image according to continuous exposure within a predetermined period, and the other pixels constituting the first line may be designated as second pixels for generating a plurality of short-time-exposure images according to intermittent exposure within the predetermined period. Using at least two pixel transfer control signals of the pixel transfer control signal lines in the second line, some pixels constituting the second line may be designated as the first pixels and the other pixels constituting the second line may be designated as the second pixels. Thereby, there is an effect that some pixels constituting the first line are designated as the first pixels and the other pixels constituting the first line are designated as the second pixels using the at least two pixel transfer control signal lines in the first line, and some pixels constituting the second line are designated as the first pixels and the other pixels constituting the second line are designated as the second pixels using the at least two pixel transfer control signal lines in the second line.

Further, according to the first embodiment of the present technology, using the pixel transfer control signal lines, a first pixel group in which a predetermined number of pixels in the specific direction and a predetermined number of pixels in the orthogonal direction are connected stepwise is designated as the first pixels, a second pixel group in which a predetermined number of pixels in the specific direction and a predetermined number of pixels in the orthogonal direction are connected stepwise is designated as the second pixels, and the first pixel group and the second pixel group may be alternately arranged in the specific direction. Thereby, there is an effect that the first pixel group and the second pixel group are alternately arranged in the specific direction.

Further, according to the first embodiment of the present technology, in the one line, using at least two pixel transfer control signal lines of the pixel transfer control signal lines, an exposure period of the pixel of the first spectral sensitivity constituting the first pixels may be set to be shorter than an exposure period of the pixel of the second or third spectral sensitivity constituting the first pixels. Thereby, there is an effect that the exposure period of the pixel of the first spectral sensitivity constituting the first pixels is set to be shorter than the exposure period of the pixel of the second or third spectral sensitivity constituting the first pixels using the at least two pixel transfer control signal lines in the one line.

Further, according to the first embodiment of the present technology, in the one line, using at least two pixel transfer control signal lines of the pixel transfer control signal lines, an exposure period of the pixel of the first spectral sensitivity constituting the second pixels may be set to be shorter than an exposure period of the pixel of the second or third spectral sensitivity constituting the second pixels. Thereby, there is an effect that the exposure period of the pixel of the first spectral sensitivity constituting the second pixels is set to be shorter than the exposure period of the pixel of the second or third spectral sensitivity constituting the second pixels using the at least two pixel transfer control signal lines in the one line.

Further, according to the first embodiment of the present technology, an arrangement of the pixel of the first spectral sensitivity, the pixel of the second spectral sensitivity, and the pixel of the third spectral sensitivity may be a Bayer arrangement. Thereby, there is an effect that the exposure timings of the plurality of pixels constituting the one line in the specific direction have the at least three patterns by controlling the exposure start and end timings of each pixel in the Bayer arrangement.

Further, according to the first embodiment of the present technology, by performing addition on the same type of pixels in units of lines in the orthogonal direction on pixels constituting two first lines adjacent in the orthogonal direction and performing addition on the same type of pixels in units of lines of the orthogonal direction on pixels constituting two second lines adjacent in the orthogonal direction, an arrangement of pixel signals after the addition may be a Bayer arrangement. Thereby, there is an effect that, by performing the addition on the same type of pixels in units of lines of the orthogonal direction for the pixels constituting the two first lines adjacent in the orthogonal direction and performing the addition on the same type of pixels in units of lines of the orthogonal direction for the pixels constituting the two second lines adjacent in the orthogonal direction, the arrangement of the pixel signals after the addition has the Bayer arrangement.

Further, according to the first embodiment of the present technology, in the one line, at least one pixel transfer control signal line is connected to the pixel of the first spectral sensitivity constituting the plurality of pixels and at least two pixel transfer control signal lines may be connected to the pixel of the second or third spectral sensitivity constituting the plurality of pixels. Thereby, there is an effect that the image sensor having the at least one pixel transfer control signal line connected to the pixel of the first spectral sensitivity constituting the plurality of pixels in the one line and the at least two pixel transfer control signal lines connected to the pixel of the second or third spectral sensitivity constituting the plurality of pixels is used.

Further, according to the first embodiment of the present technology, the at least one pixel transfer control signal line connected to the pixel of the first spectral sensitivity may be arranged between the at least two pixel transfer control signal lines connected to the pixel of the second or third spectral sensitivity. Thereby, there is an effect that the image sensor in which the at least one pixel transfer control signal line connected to the pixel of the first spectral sensitivity is arranged between the at least two pixel transfer control signal lines connected to the pixel of the second or third spectral sensitivity is used.

Further, according to the first embodiment of the present technology, the pixel of the first spectral sensitivity may be a green (G) pixel, the pixel of the second spectral sensitivity may be a red (R) pixel, and the pixel of the third spectral sensitivity may be a blue (B) pixel. Thereby, there is an effect that an image sensor formed by green (G), red (R), and blue (B) pixels is used.

Further, according to the first embodiment of the present technology, the plurality of pixels may share one analog/digital (A/D) converter between two adjacent pixels in the specific direction. And exposure timings of the two adjacent pixels may be shifted using at least two pixel transfer control signal lines of the pixel transfer control signal lines. Thereby, there is an effect that the exposure timings of the two adjacent pixels are shifted using the at least two pixel transfer control signal lines.

Further, according to the first embodiment of the present technology, a pixel group formed by a plurality of pixels in the specific direction and a plurality of pixels in an orthogonal direction may share one floating diffusion. Thereby, there is an effect that the pixel group formed by the plurality of pixels in the specific direction and the plurality of pixels in the orthogonal direction shares the one floating diffusion (FD).

Further, according to a second embodiment, there is provided an imaging apparatus and an imaging method thereof including an image sensor configured to have at least three pixel transfer control signal lines for controlling exposure start and end timings of each pixel on a per line basis so that exposure timings of a plurality of pixels constituting one line in a specific direction have at least three patterns, and an image processing section configured to perform image processing on an image signal output from the image sensor. Thereby, there is an effect that the image processing on the image signal output from the image sensor in which the exposure timings of the plurality of pixels constituting the one line in the specific direction have the at least three patterns is performed by controlling the exposure start and end timings of each pixel.

Further, according to a third embodiment, there is provided electronic device and an imaging method thereof including an image sensor configured to have at least three pixel transfer control signal lines for controlling exposure start and end timings of each pixel on a per line basis so that exposure timings of a plurality of pixels constituting one line in a specific direction have at least three patterns, and an image processing section configured to perform image processing on an image signal output from the image sensor, and a control section configured to control the image signal subjected to the image processing to be output or recorded. Thereby, there is an effect that the image processing on the image signal output from the image sensor in which the exposure timings of the plurality of pixels constituting the one line in the specific direction have the at least three patterns is performed by controlling the exposure start and end timings of each pixel and the image signal is controlled to be output or recorded.

In accordance with the embodiments of the present technology, there is an excellent effect that appropriate imaging control can be performed.

BRIEF DESCRIPTION OF THE DRAWINGS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

FIG. 5 is a diagram illustrating an example of the pixel arrangement of the CFs mounted on the light receiving section of the image sensor 100 in accordance with the first embodiment of the present technology;

FIG. 7 is a diagram illustrating an example of the pixel arrangement of the CFs mounted on the light receiving section of the image sensor 100 in accordance with the first embodiment of the present technology;

FIG. 23 is a block diagram illustrating a functional configuration example of an imaging apparatus 800 in accordance with an embodiment of the present technology.

DETAILED DESCRIPTION OF THE EMBODIMENT(S)

Hereinafter, modes (hereinafter referred to as embodiments) for carrying out the present technology will be described. Description will be given in the following order.

Figure 1:
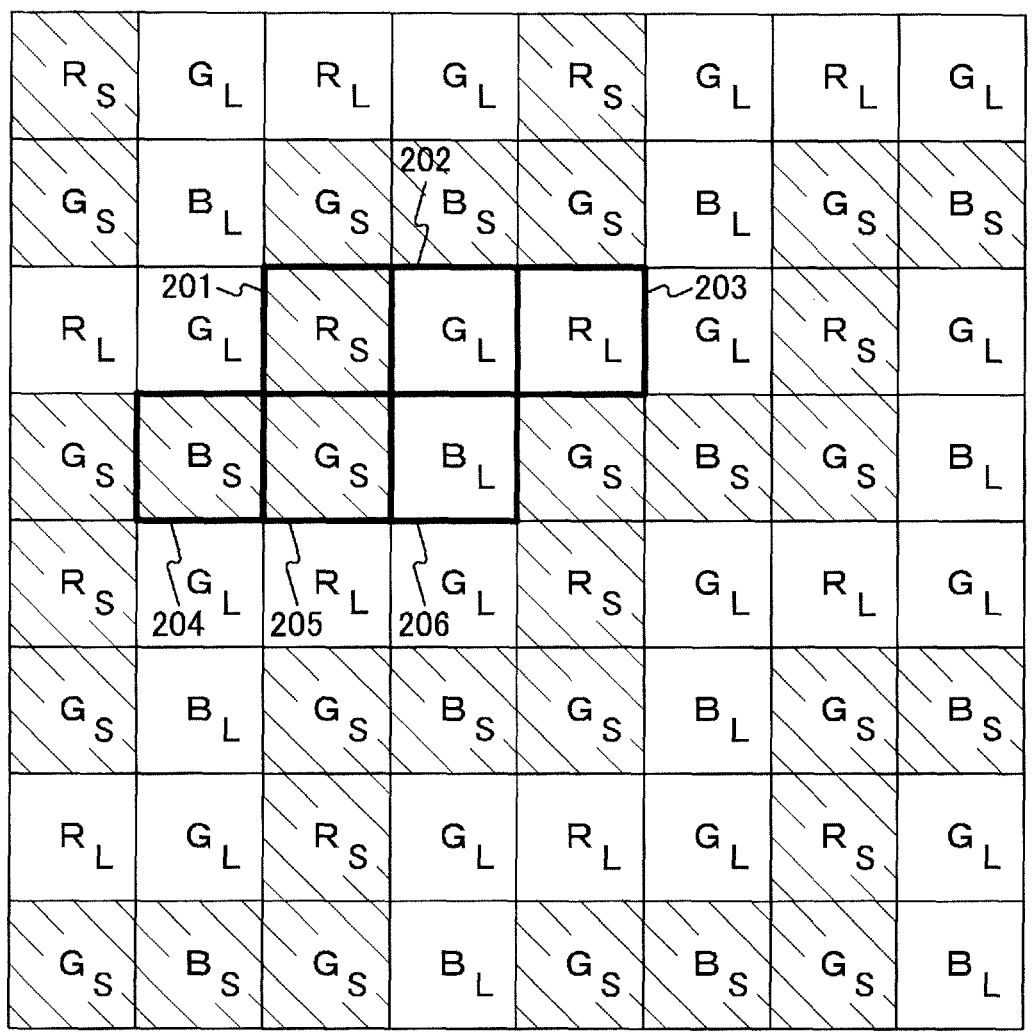
FIG. 1 is a diagram illustrating an example of a pixel arrangement of color filters (CFs) mounted on a light receiving section of an image sensor 100 in accordance with a first embodiment of the present technology.

1. First Embodiment (Example in Which Three Pixel Transfer Control Signal Lines Are Provided on One Line in Horizontal Direction)
2. Second Embodiment (Example of Image sensor in Which Two Pixels in Vertical Direction Share One A/D Converter)
3. Third Embodiment (Example of Image sensor in Which Signals Read from Pixels Are Added and Used)
4. Fourth Embodiment (Example of Image sensor Using Pixel Circuit Shared by Eight Pixels)
5. Fifth Embodiment (Layout Example of Pixel Transfer Control Signal Lines)
6. Application Example 1. First Embodiment Pixel Arrangement Example of CFs FIG. 1 is a diagram illustrating an example of a pixel arrangement of CFs mounted on a light receiving section of an image sensor 100 in accordance with the first embodiment of the present technology. In FIG. 1, each rectangle schematically represents a pixel.

In addition, in the first embodiment of the present technology, an example of CFs with three colors of RGB including G, R, and B is shown. Here, rectangles that are not hatched with diagonal lines represent long-time-exposure pixels, and rectangles that are hatched with diagonal lines represent short-time-exposure pixels.

Here, a long-time-exposure pixel is a pixel to be read by continuous exposure (long-time exposure) within a predetermined exposure period. In addition, a short-time-exposure pixel is a pixel for which intermittent exposure (short-time exposure) is performed within a predetermined exposure period and from which reading is performed at each exposure time.

In addition, a reference sign inside each rectangle indicates a type of CF. For example, among G pixels, "$G_L$" is assigned to a long-time-exposure pixel and "$G_S$" is assigned to a short-time-exposure pixel. In addition, among R pixels, "$R_L$" is assigned to a long-time-exposure pixel and "$R_S$" is assigned to a short-time-exposure pixel. Further, among B pixels, "$B_L$" is assigned to a long-time-exposure pixel and "$B_S$" is assigned to a short-time-exposure pixel.

As described above, in the image sensor 100, a first pixel group (short-time-exposure pixel group) and a second pixel group (long-time-exposure pixel group) are alternately arranged in a horizontal direction. Here, the first pixel group (short-time-exposure pixel group) is a pixel group in which three first pixels (short-time-exposure pixels) arranged adjacent to one another in the horizontal direction are connected stepwise to three first pixels (short-time-exposure pixels) arranged adjacent to one another in a vertical direction. That is, the first pixel group (short-time-exposure pixel group) is a pixel group formed by rectangles hatched with diagonal lines. In addition, the second pixel group (long-time-exposure pixel group) is a pixel group in which three second pixels (long-time-exposure pixels) arranged adjacent to one another in the horizontal direction are connected stepwise to three second pixels (long-time-exposure pixels) arranged adjacent to one another in the vertical direction. That is, the second pixel group (long-time-exposure pixel group) is a pixel group formed by rectangles not hatched with diagonal lines. In the first embodiment of the present technology, a configuration illustrated in FIG. 1 will be described to be a spatially varying exposure (SVE) zigzag sensitivity pattern. In imaging within one frame, the imaging is normally performed on all pixels in the same exposure period. On the other hand, the SVE is an imaging method of performing imaging while periodically changing an exposure period within one frame in imaging within one frame and implementing the effect of a wide dynamic range or the like using signal processing technology.

In addition, in the image sensor 100, an arrangement of a pixel (for example, a G pixel) of first spectral sensitivity, a pixel (for example, an R pixel) of second spectral sensitivity, and a pixel (for example, a B pixel) of third spectral sensitivity becomes a Bayer arrangement.

As described above, the first embodiment of the present technology is aimed at implementing a pixel sensitivity pattern of two types of sensitivities within one frame on a CMOS image sensor (CIS). For example, it is possible to change the sensitivity, for example, by setting a pixel exposure period as a different exposure period.

[Configuration Example of Basic Circuit of Pixel]

Figure 2:
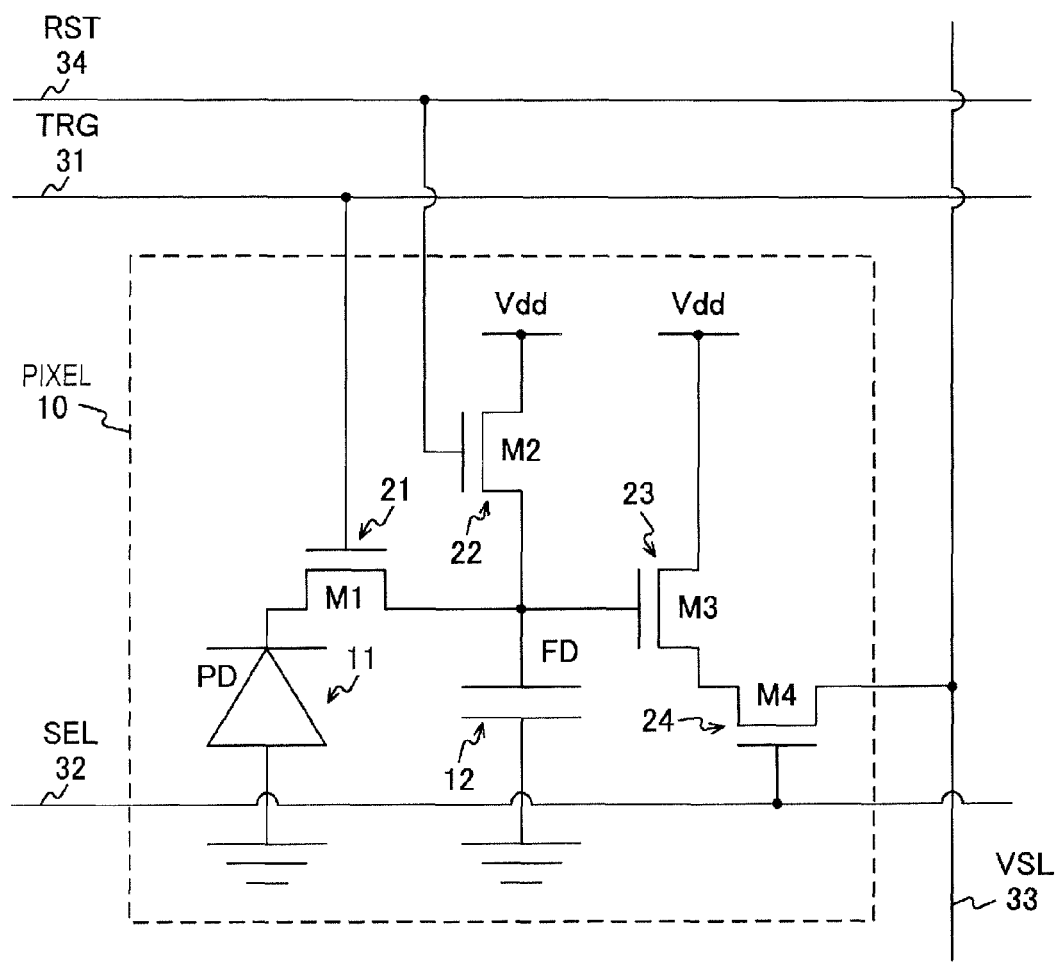
FIG. 2 is a diagram illustrating a configuration example of a basic circuit of a pixel 10 provided in the image sensor 100 in accordance with the first embodiment of the present technology.

FIG. 2 is a diagram illustrating the configuration example of the basic circuit of a pixel 10 provided in the image sensor 100 in accordance with the first embodiment of the present technology. In FIG. 2, a configuration example of a CIS pixel circuit of a general configuration of four transistors (Tr) that are not shared by pixels is illustrated.

The pixel 10 is formed by a photodiode (PD) 11, which is a light receiving section, an FD 12, and four MOS-field effect transistors (MOSFETs) (M1 to M4) 21 to 24. In addition, the pixel 10 is connected to a pixel transfer control signal line (pixel transfer gate control signal line) (TRG) 31, a pixel read selection control signal line (SEL) 32, a vertical signal line (read line) (VSL) 33, and a pixel reset control signal line (RST) 34.

Light with which a pixel is irradiated is converted into electrons in the PD 11, and charges corresponding to an amount of light are accumulated in the PD 11. The MOSFET (M1) 21 controls a charge transfer between the PD 11 and the FD 12. A signal of the pixel transfer control signal line (TRG) 31 is applied to a gate electrode of the MOSFET (M1) 21, and hence the charges accumulated in the PD 11 are transferred to the FD 12. The FD 12 is connected to a gate electrode of the MOSFET (M3) 23. When a control signal of the pixel read selection control signal line (SEL) 32 is applied to a gate electrode of the MOSFET (M4) 24, a voltage corresponding to the charges accumulated in the FD 12 can be read as a signal from the vertical signal line (VSL) 33. When a reset signal of the pixel reset control signal line (RST) 34 is applied to a gate electrode of an MOSFET (M2) 22, a charge accumulation state is reset because the charges accumulated in the FD 12 flow through the MOSFET (M2) 22.

[Configuration Example of Pixel Control Circuit and Pixel Wiring]

Figure 3:
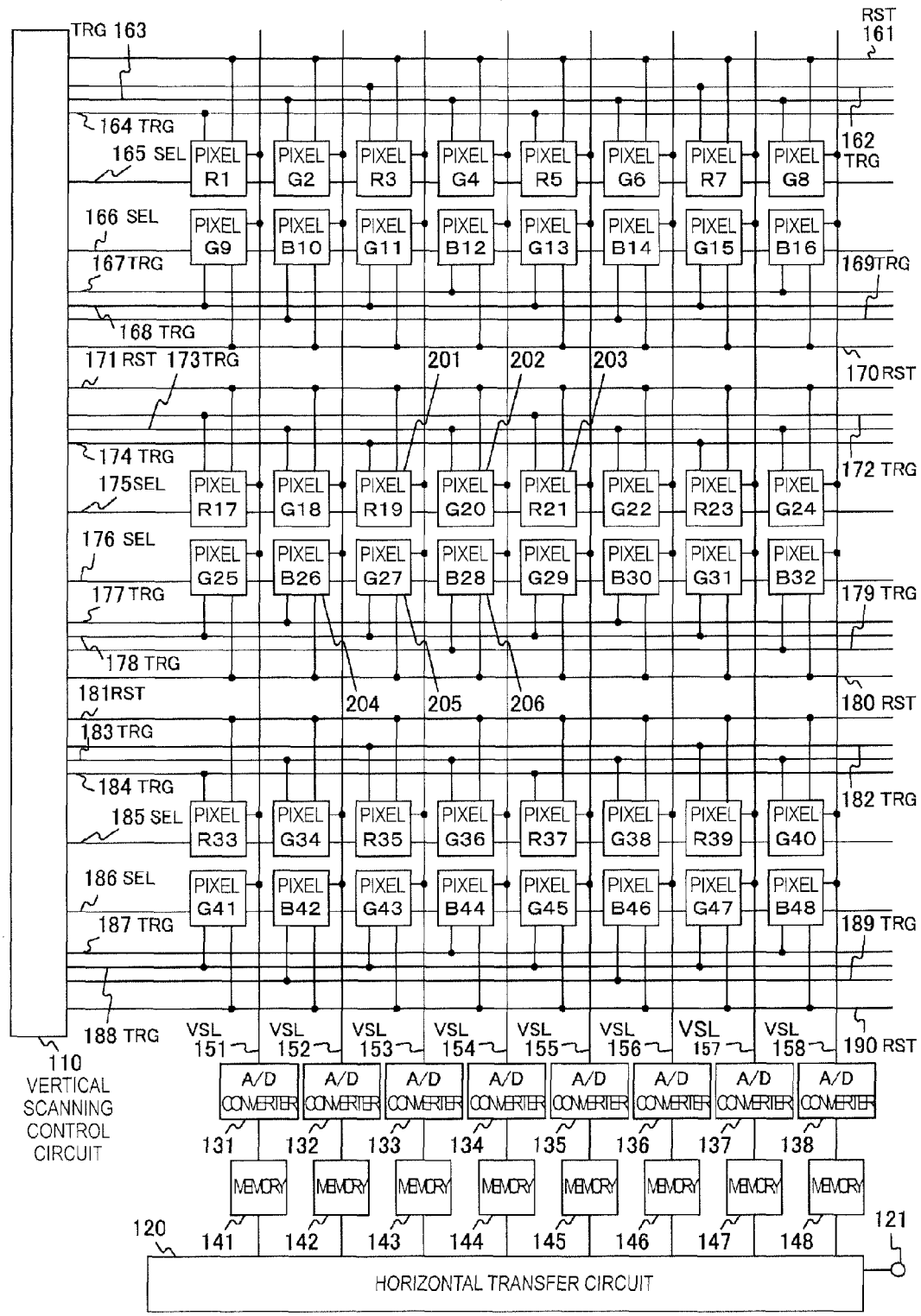
FIG. 3 is a diagram illustrating a configuration example of a pixel control circuit and a pixel wiring of the image sensor 100 in accordance with the first embodiment of the present technology.

FIG. 3 is a diagram illustrating the configuration example of the pixel control circuit and the pixel wiring of the image sensor 100 in accordance with the first embodiment of the present technology.

The image sensor 100 includes a vertical scanning control circuit 110, a horizontal transfer circuit 120, analog/digital (A/D) converters 131 to 138, memories 141 to 148, and a plurality of pixels (pixels R1 to B48). The plurality of pixels (pixels R1 to B48) each having the structure illustrated in FIG. 2 are arranged in a two-dimensional (2D) square lattice in the image sensor 100. In addition, CF types R, G, and B and identification numbers 1 to 48 are assigned inside rectangles representing pixels.

In general, a sequence of a longitudinal direction of the image sensor is referred to as a column and a sequence of a lateral direction is referred to as a row. Thus, hereinafter, description will be given appropriately using names of the column and the row. In addition, in this example, some pixels (the pixels R1 to B48) in the image sensor 100 and sections associated therewith are representatively shown, and the illustration and description of the other configurations are omitted.

The vertical scanning control circuit 110 turns on/off a switch between each pixel and the vertical signal line VSL by controlling signal lines RST, TRG, and SEL wired in a row direction. Control of the signal lines will be described in detail with reference to FIGS. 4, 6, 8 to 10 and the like.

The horizontal transfer circuit 120 is a circuit for horizontally transferring digital data held in the memories 141 to 148.

Each of the A/D converters 131 to 138 converts image data, which is an analog value, from each pixel into digital data (a digital value).

The memories 141 to 148 sequentially store digital data converted by the A/D converters 131 to 138.

In addition, vertical signal lines (read lines) (VSL) 151 to 158 are wired in a vertical column direction, and pixels on the same vertical column share one read line. In addition, the vertical signal lines (VSL) 151 to 158 are exclusively connected to an output terminal 121 by the horizontal transfer circuit 120. Here, pixels R1 and G2 and the like (pixels with the subscript "L" assigned to pixels illustrated in FIG. 1) are pixels (long-time-exposure pixels) that are continuously exposed to light within a predetermined exposure period (long-time exposure) and ultimately read. In addition, pixels R3 and R7 and the like (pixels with the subscript "S" assigned to pixels illustrated in FIG. 1) are pixels (short-time-exposure pixels) that are intermittently exposed to light within a predetermined exposure period (short-time exposure) and read at each exposure time.

As described above, one certain pixel can be connected to the output terminal 121 according to selection control of the vertical scanning control circuit 110. Thus, signals of all pixels can be read in time division while the pixels are sequentially selected.

In addition, for lines in the horizontal direction in the image sensor 100, pixel transfer control signal lines (TRG) 162, 163, and the like, a pixel read selection control signal line (SEL) 165 and the like, and a pixel reset control signal line (RST) 161 and the like are wired. In addition, in accordance with the SVE zigzag sensitivity pattern, the R or B pixel is connected to the pixel transfer control signal line (TRG) at every other color pixel.

Here, pixel transfer control signal lines TRG in one line in the horizontal direction for implementing the sensitivity pattern illustrated in FIG. 1 will be described. For example, in terms of the horizontal line direction in the SVE zigzag sensitivity pattern illustrated in FIG. 1, there are two types of sensitivities in one line. Thus, because there are two types of exposure periods on one line in the horizontal direction, at least two pixel transfer control signal lines TRG are necessary.

Here, a phenomenon that a CF sensitivity difference affects the quality of an image has recently occurred while pixel size reduction has progressed. As a method of reducing the influence of the sensitivity difference, a method of a color-specific shutter mechanism may be used. This color-specific shutter mechanism is a method of changing an exposure period for every filter color of each pixel and reducing the influence due to the sensitivity difference. When the exposure period is changed for every filter color of each pixel, for example, the exposure period is lengthened for color pixels (for example, B and R pixels) having bad sensitivity and shortened for a color pixel (for example, a G pixel) having good sensitivity. In addition, for a difference in the exposure period, processing is appropriately performed in a direction in which there is no difference in a calculation process.

In order to execute the color-specific shutter mechanism, a mechanism for resetting a pixel at a different timing for every color is necessary. Here, when the Bayer arrangement is considered, there are two types of color information on one line in the horizontal direction. Thus, at least two pixel transfer control signal lines connected for every color pixel are necessary.

In addition, when a method of providing the color-specific shutter mechanism and implementing the SVE zigzag sensitivity pattern illustrated in FIG. 1 is considered, the G pixels on one line in the horizontal direction have the same sensitivity in the SVE zigzag sensitivity pattern. On the other hand, the R or B pixel has two types of sensitivities of the long-time exposure and the short-time exposure. That is, for the pixel transfer control signal lines TRG connected to the B and R pixels, it is necessary for the exposure period to be set as two types of exposure periods. Thus, although at least one pixel transfer control signal line TRG connected to the G pixel can be provided, at least two pixel transfer control signal lines TRG connected to the R or B pixel are necessary. Thus, at least three pixel transfer control signal lines TRG are necessary in one line in the horizontal direction.

That is, the image sensor 100 has at least three pixel transfer control signal lines for controlling exposure start and end timings of each pixel on a per line basis so that exposure timings of a plurality of pixels constituting one line in a specific direction have at least three patterns.

In addition, in one line, at least one pixel transfer control signal line is connected to a pixel of first spectral sensitivity constituting a plurality of pixels, and at least two pixel transfer control signal lines are connected to a pixel of second or third spectral sensitivity constituting the plurality of pixels.

Here, a line on which the pixel of the first spectral sensitivity and the pixel of the second spectral sensitivity constituting the plurality of pixels in the specific direction (for example, the horizontal direction) are alternately arranged is designated as a first line. In addition, a line on which the pixel of the first spectral sensitivity and the pixel of the third spectral sensitivity constituting the plurality of pixels in the specific direction are alternately arranged is designated as a second line. In this case, in the image sensor 100, the first line and the second line are alternately arranged in an orthogonal direction (for example, the vertical direction).

[Timing Chart Example of Control Signals]

Figure 4:
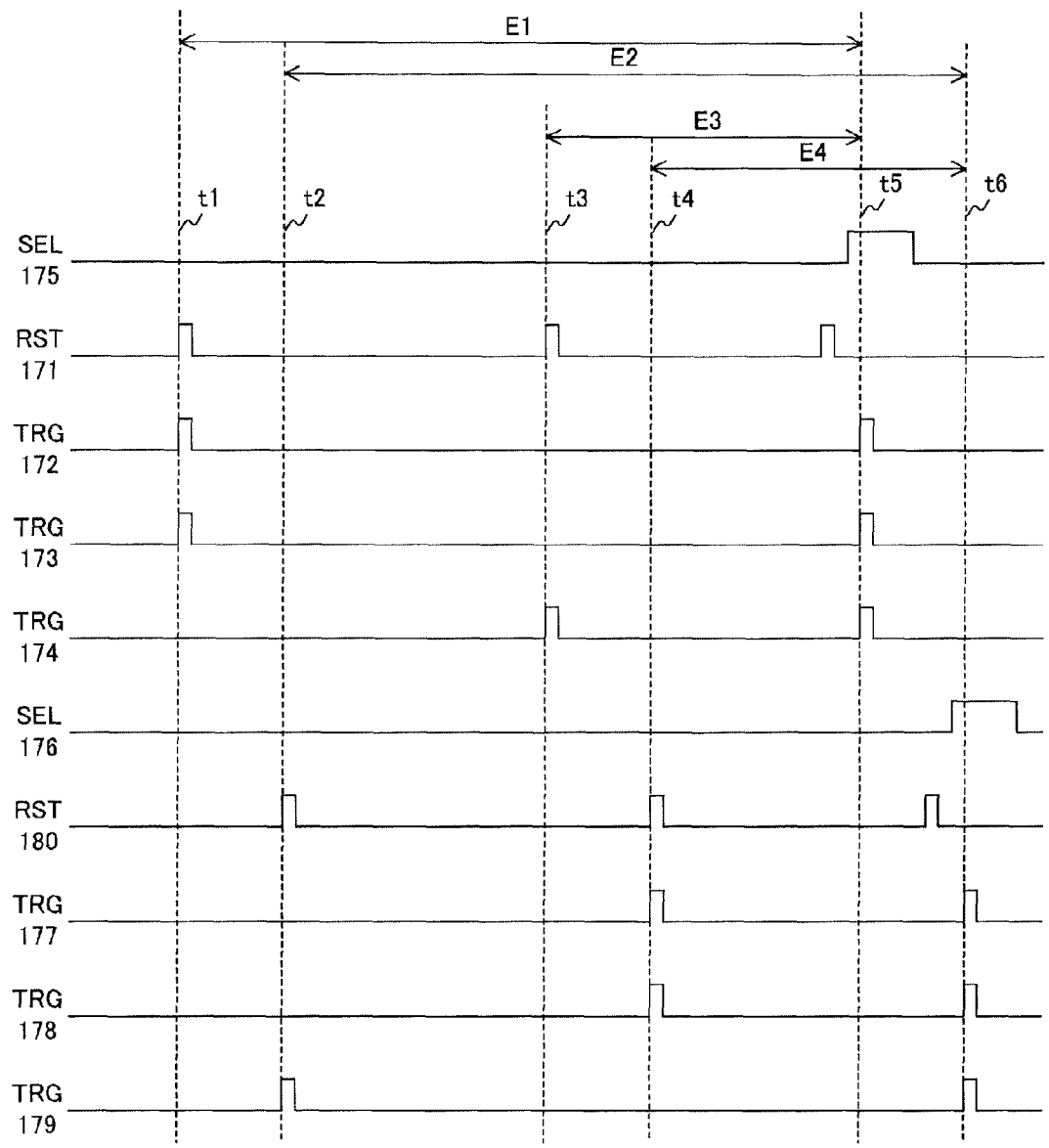
FIG. 4 is a timing chart schematically illustrating control signals for pixels constituting the image sensor 100 in accordance with the first embodiment of the present technology.

FIG. 4 is a timing chart schematically illustrating control signals for pixels constituting the image sensor 100 in accordance with the first embodiment of the present technology. In FIG. 4, the timing chart corresponding to pixels 201 to 206 among the pixels illustrated in FIG. 3 is illustrated. In FIG. 1, the pixels 201 to 206 surrounded by a thick rectangular frame are illustrated. In addition, in FIG. 4, the timing chart for implementing the SVE zigzag sensitivity pattern is illustrated.

In addition, a horizontal axis illustrated in FIG. 4 is a time axis. Each waveform illustrated in FIG. 4 denoted by the same reference sign as in a corresponding signal line illustrated in FIG. 3 will be described. In addition, exposure periods E1 and E2 are periods corresponding to long-time-exposure periods, and exposure periods E3 and E4 are periods corresponding to short-time-exposure periods. In FIG. 4, for ease of understanding, an example in which a color-specific exposure period by a color-specific shutter is not changed is illustrated.

As illustrated in FIG. 3, a pixel reset control signal line (RST) 171 of the pixels 201 to 203 (R19, G20, and R21) is common.

Here, a pixel electronic shutter means that an operation of turning on the image reset control signal line RST (at a high (H) level because the reset transistor M2 is an N-channel MOSFET (NMOS)) and an operation of activating the pixel transfer control signal line TRG are simultaneously performed. According to this pixel electronic shutter, charges accumulated in the PD (photodiode) serving as a target are reset. Thus, if the pixel transfer control signal line TRG is turned off even when the pixel reset control signal line RST is turned on, the target PD is not reset.

For example, at time t1, because the pixel reset control signal line (RST) 171 and pixel transfer control signal lines (TRG) 172 and 173 are turned on, the pixel electronic shutters of the pixels 202 and 203 are released. Thus, during a period (the exposure period E1) from time t1 to time t5, the pixels 202 and 203 are exposed to light.

In addition, at time t3, because the pixel reset control signal line (RST) 171 and the pixel transfer control signal line (TRG) 173 are turned on, the pixel electronic shutter of the pixel 201 is released. Thus, during a period (the exposure period E1) from time t3 to time t5, the pixel 201 is exposed to light.

As described above, each pixel can be controlled so that a plurality of pixels on one line in the horizontal direction are exposed to light in different exposure periods.

In addition, likewise, it is possible to perform control even for the next line (pixels 204 to 206 (B26, G27, and B28)).

For example, at time t2, because a pixel reset control signal line (RST) 176 and a pixel transfer control signal line (TRG) 179 are turned on, the pixel electronic shutter of the pixel 206 is released. Thus, during a period (the exposure period E2) from time t2 to time t6, the pixel 206 is exposed to light.

In addition, at time t4, because the pixel reset control signal line (RST) 176 and the pixel transfer control signal lines (TRG) 177 and 178 are turned on, the pixel electronic shutters of the pixels 204 and 205 are released. Thus, during a period (the exposure period E4) from time t4 to time t6, the pixels 204 and 205 are exposed to light. Here, it is established that Exposure Period E1=E2 and Exposure Period E3=E4.

As described above, at a pixel-reset timing, a desired sensitivity pattern can be generated by appropriately controlling ON/OFF of three pixel transfer control signal lines TRG in one line in the horizontal direction.

Figure 6:
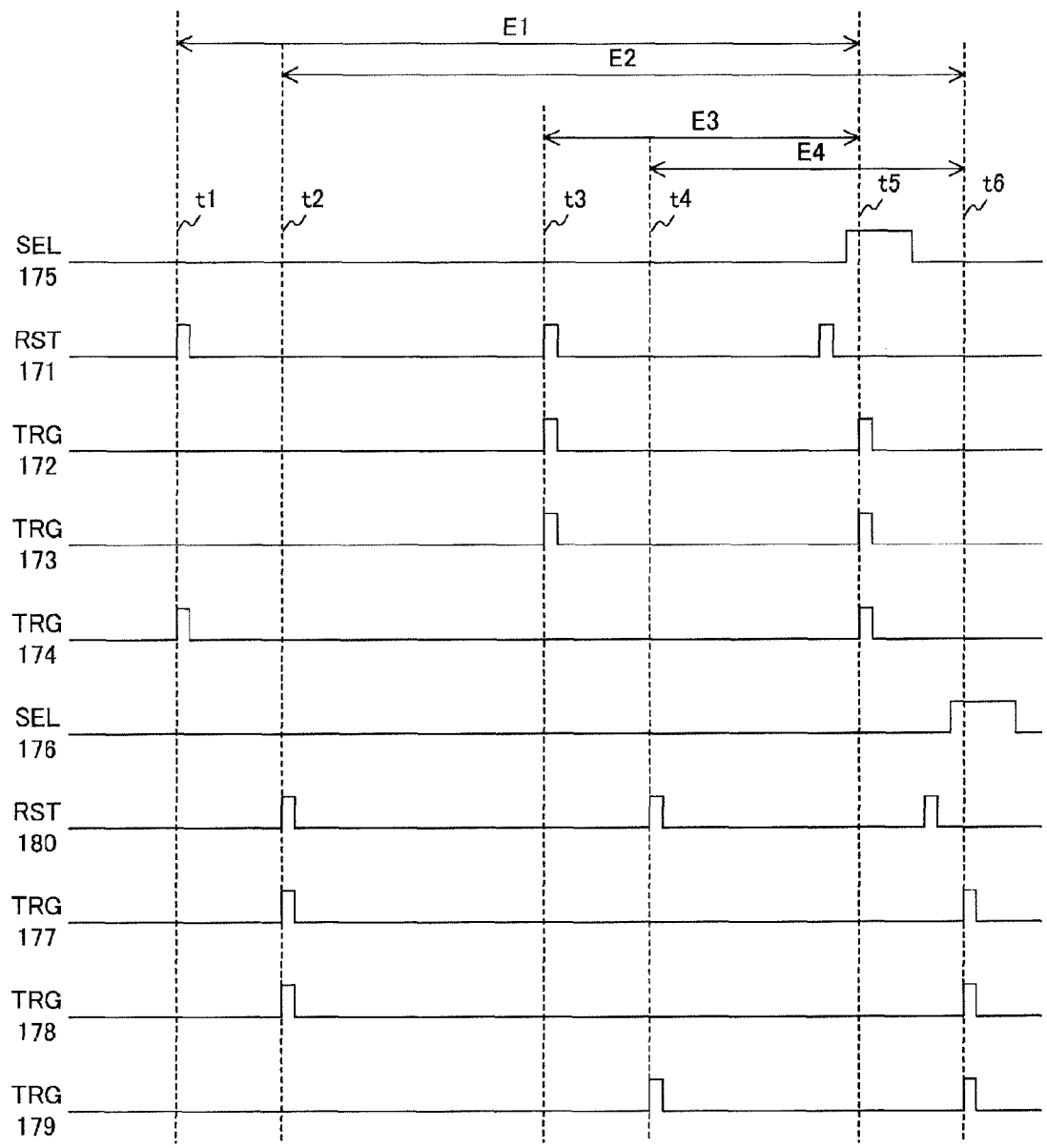
FIG. 6 is a timing chart schematically illustrating control signals for pixels constituting the image sensor 100 in accordance with the first embodiment of the present technology.
Figure 8:
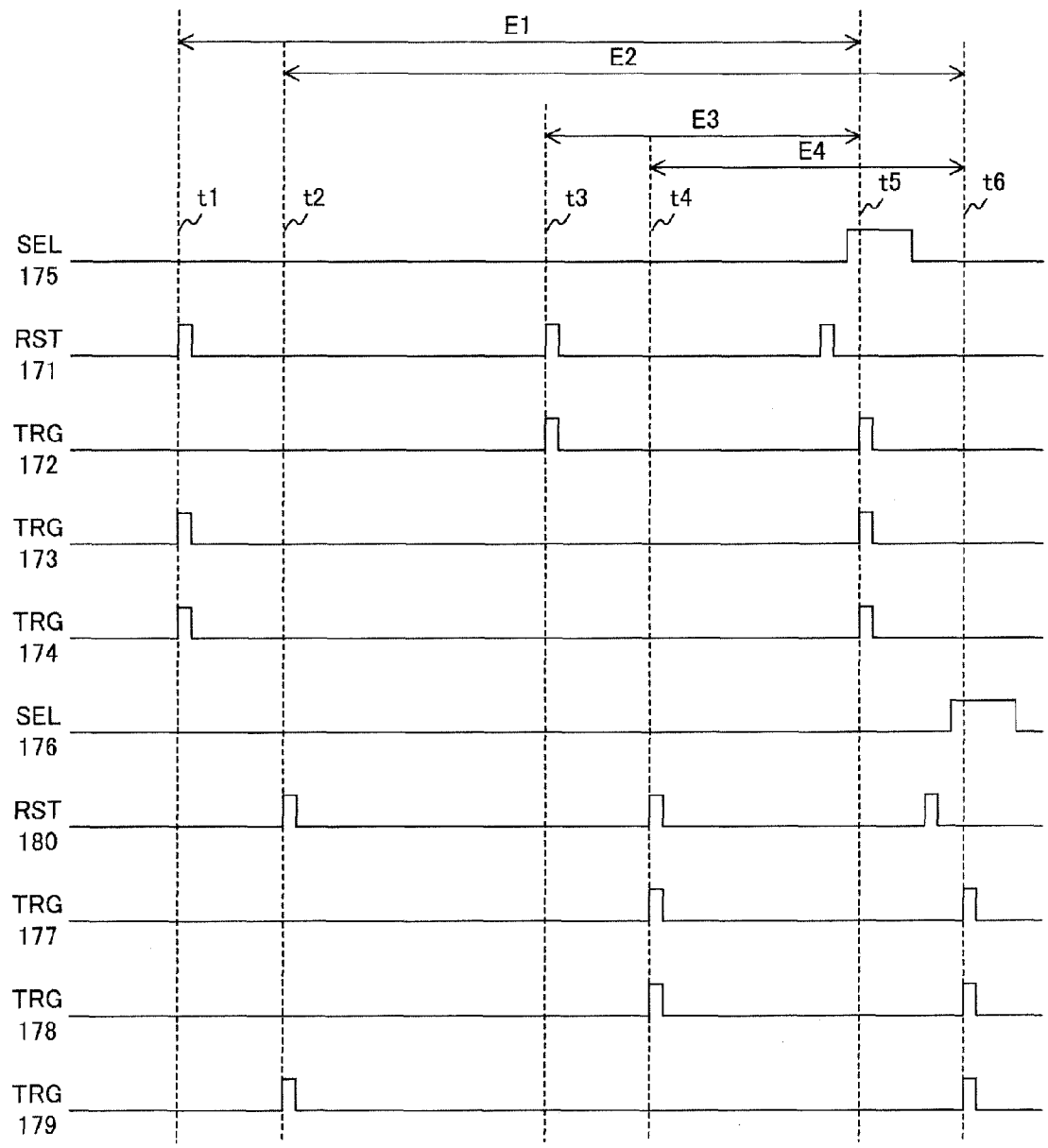
FIG. 8 is a timing chart schematically illustrating control signals for pixels constituting the image sensor 100 in accordance with the first embodiment of the present technology.

In addition, for example, it is possible to switch arrangements of the long-time-exposure pixels and the short-time-exposure pixels by switching ON/OFF of the pixel transfer control signal lines TRG at times t1 to t6. Arrangement examples are illustrated in FIGS. 5 and 7, and examples of timing charts corresponding thereto are illustrated in FIGS. 6 and 8.

[Pixel Arrangement Example and Timing Chart Example]

Here, an example in which the arrangements of the long-time-exposure pixels and the short-time-exposure pixels are switched will be described.

Figure 5:
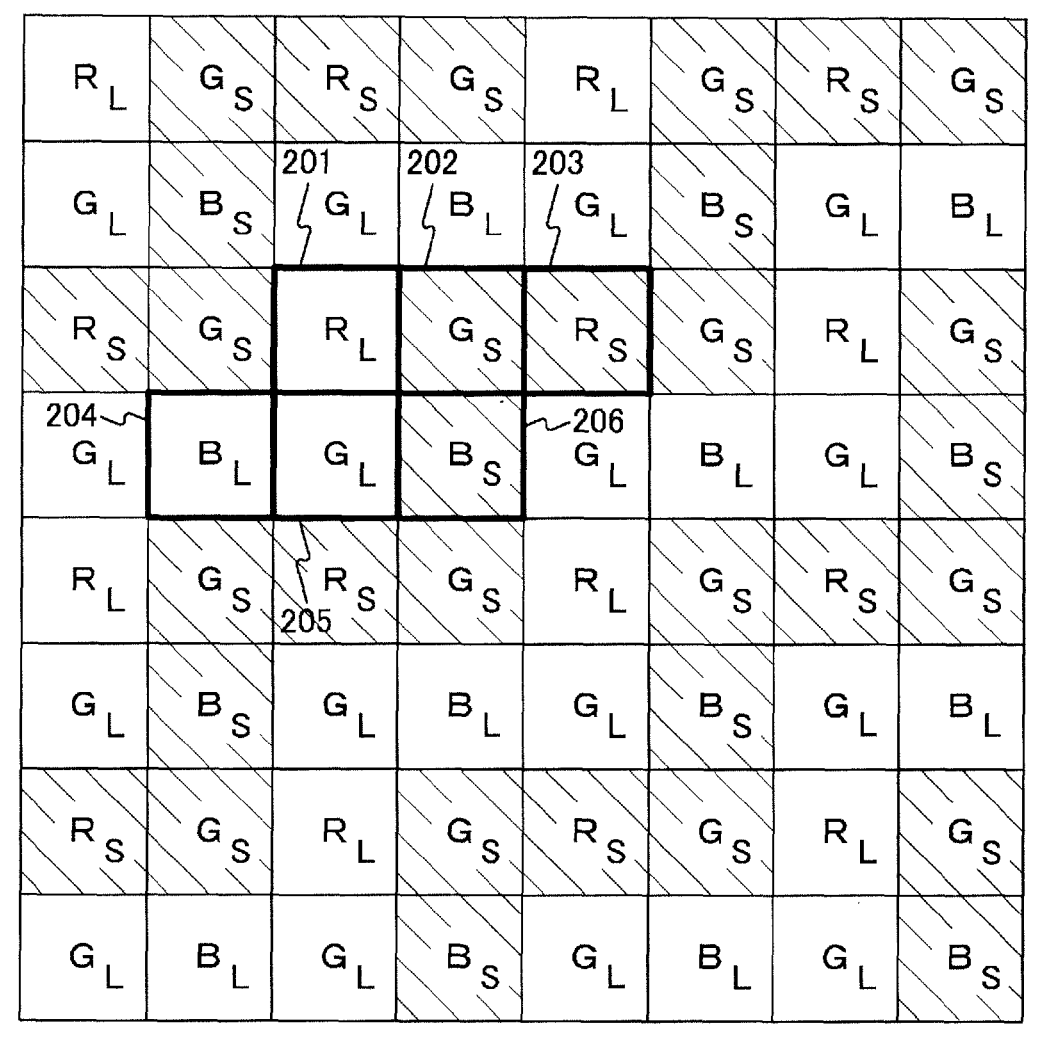

FIG. 5 is a diagram illustrating an example of the pixel arrangement of CFs mounted on the light receiving section of the image sensor 100 in accordance with the first embodiment of the present technology. FIG. 5 is a modified example of FIG. 1, and is different from FIG. 1 in that the arrangements of the long-time-exposure pixels and the short-time-exposure pixels are switched. However, except for the above point, FIG. 5 is substantially the same as FIG. 1. Thus, parts common to those of FIG. 1 are denoted by the same reference signs as in FIG. 1 and detailed description thereof is omitted.

FIG. 6 is a timing chart schematically illustrating control signals for pixels constituting the image sensor 100 in accordance with the first embodiment of the present technology. In FIG. 6, a timing chart for implementing the arrangements of the long-time-exposure pixels and the short-time-exposure pixels illustrated in FIG. 5 is illustrated.

FIG. 6 is a modified example of FIG. 4, and is different from FIG. 4 in that ON/OFF of the pixel transfer control signal lines TRG at times t1 to t6 is switched. However, except for the above point, FIG. 6 is substantially the same as FIG. 4. Thus, parts common to those of FIG. 4 are denoted by the same reference signs as in FIG. 4 and detailed description thereof is omitted.

As illustrated in FIGS. 5 and 6, it is possible to switch the arrangements of the long-time-exposure pixels and the short-time-exposure pixels by switching ON/OFF of the pixel transfer control signal lines TRG at times t1 to t6.

[Pixel Arrangement Example and Timing Chart Example]

Here, an example in which a direction of the SVE zigzag sensitivity pattern is changed will be described.

FIG. 7 is a diagram illustrating an example of the pixel arrangement of CFs mounted on the light receiving section of the image sensor 100 in accordance with the first embodiment of the present technology. FIG. 7 is a modified example of FIG. 1, and is different from FIG. 1 in that the direction of the SVE zigzag sensitivity pattern is switched. However, except for the above point, FIG. 7 is substantially the same as FIG. 1. Thus, parts common to those of FIG. 1 are denoted by the same reference signs as in FIG. 1 and detailed description thereof is omitted.

FIG. 8 is a timing chart schematically illustrating control signals for pixels constituting the image sensor 100 in accordance with the first embodiment of the present technology. In FIG. 8, the timing chart for implementing an arrangement in which the direction of the SVE zigzag sensitivity pattern illustrated in FIG. 7 has been changed is illustrated.

FIG. 8 is a modified example of FIG. 4, and is different from FIG. 4 in that ON/OFF of the pixel transfer control signal lines TRG at times t1 to t6 is switched. However, except for the above point, FIG. 8 is substantially the same as FIG. 4. Thus, parts common to those of FIG. 4 are denoted by the same reference signs as in FIG. 4 and detailed description thereof is omitted.

As illustrated in FIGS. 7 and 8, the direction of the SVE zigzag sensitivity pattern can be changed by switching ON/OFF of the pixel transfer control signal lines TRG at times t1 to t6.

As described above, a desired SVE zigzag sensitivity pattern can be generated by providing three pixel transfer control signal lines TRG in one line in the horizontal direction and switching pixel electronic shutter timings.

[Color-Specific Shutter Control Example]

Figure 9:
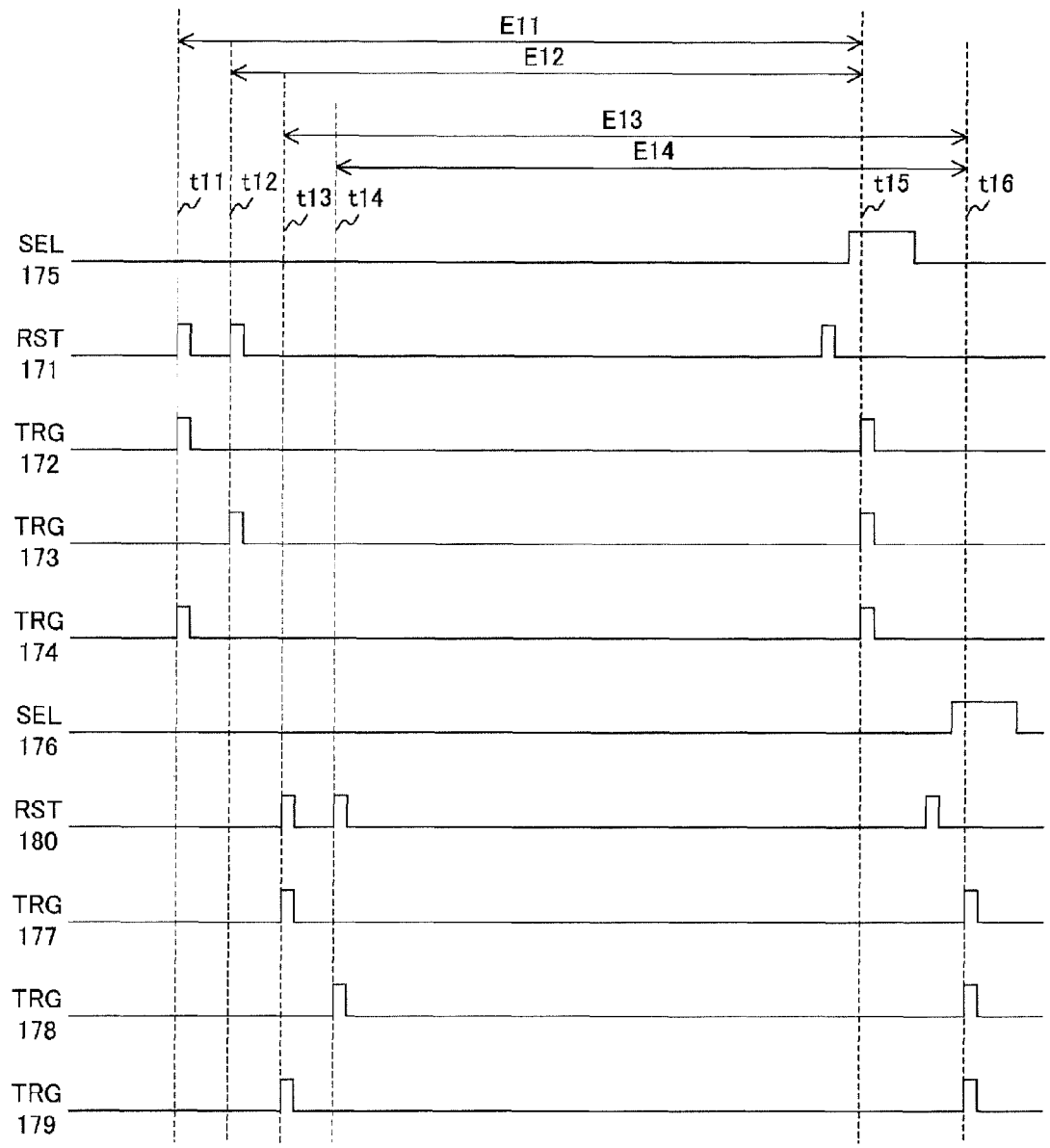
FIG. 9 is a timing chart schematically illustrating control signals for pixels constituting the image sensor 100 in accordance with the first embodiment of the present technology.
Figure 10:
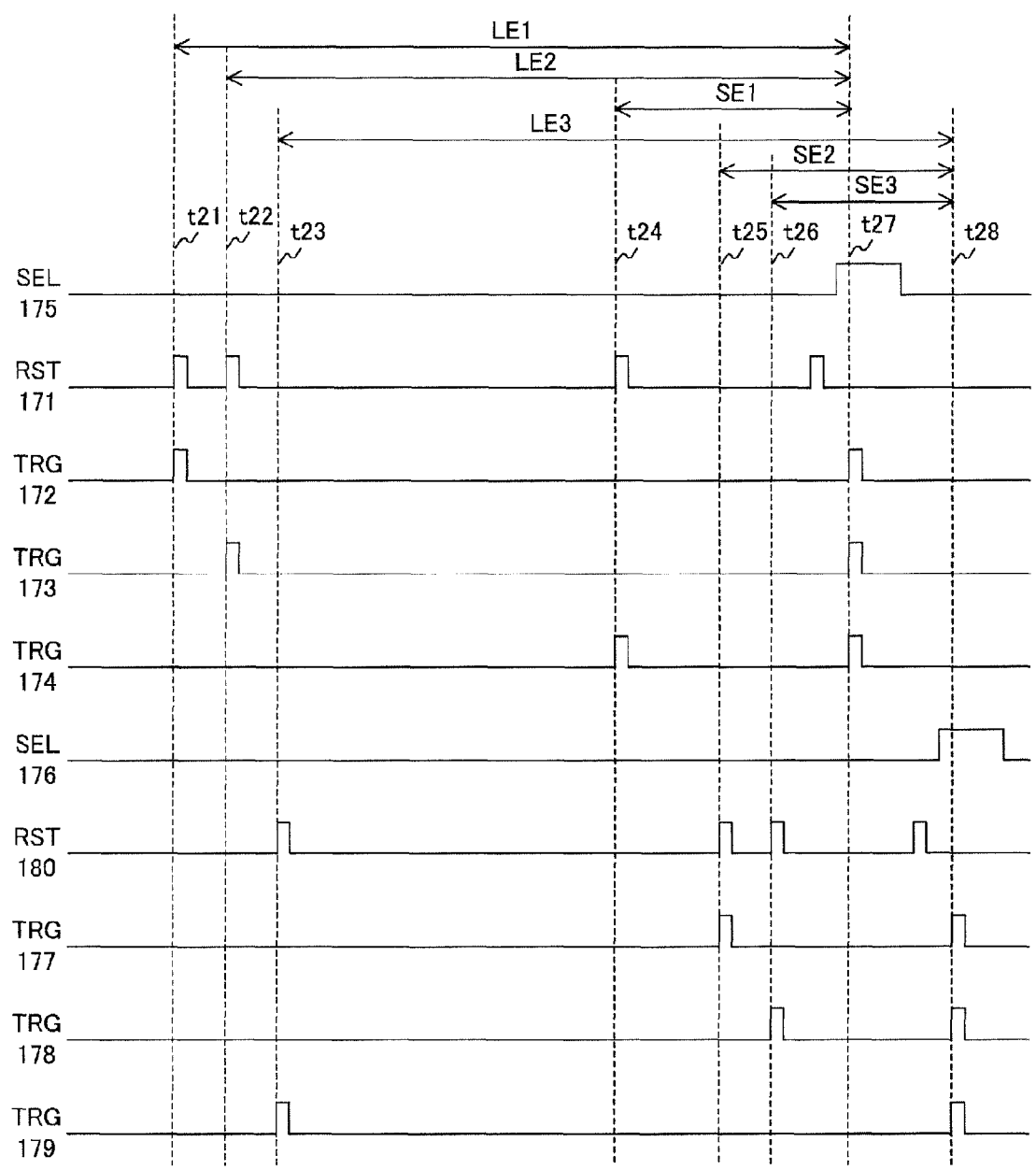
FIG. 10 is a timing chart schematically illustrating control signals for pixels constituting the image sensor 100 in accordance with the first embodiment of the present technology.

Next, an example in which a color-specific shutter is controlled for each pixel constituting the image sensor 100 will be described. First, a control timing example when the color-specific shutter is controlled according to a general single-exposure imaging method instead of the SVE zigzag sensitivity pattern will be described (FIG. 9). Next, a control timing example for controlling the color-specific shutter and implementing the SVE zigzag sensitivity pattern will be described (FIG. 10).

[Timing Chart Example of Control Signals]

FIG. 9 is a timing chart schematically illustrating control signals for pixels constituting the image sensor 100 in accordance with the first embodiment of the present technology. In FIG. 9, the timing chart for implementing the color-specific shutter according to the general single-exposure imaging method in the image sensor 100 illustrated in FIG. 3 is illustrated. Because FIG. 9 is a modified example of FIG. 4, signal lines common to those of FIG. 4 are denoted by the same reference signs as in FIG. 4 and detailed description thereof is omitted.

As described above, sensitivity is different for every color of the CFs according to pixel size reduction and hence a sufficient signal amount is likely not to be obtained in a low-sensitivity pixel. Thus, it is important to reduce the adverse effect of such a sensitivity difference on final signal processing. For example, because a G pixel generally has higher sensitivity than R and B pixels, an exposure period for the G pixel can be set to be shorter. As described above, there is considered to be a difference in an exposure period for every type of pixel and hence a method (color-specific shutter) of offsetting a CF sensitivity difference may be employed.

For example, at time t11, because the pixel reset control signal line (RST) 171 and the pixel transfer control signal lines (TRG) 172 and 174 are turned on, the pixel electronic shutters of the pixels 201 and 203 are released. In addition, at time t12, because the pixel reset control signal line (RST) 171 and the pixel transfer control signal line (TRG) 173 are turned on, the pixel electronic shutter of the pixel 202 is released. That is, the pixel electronic shutter of the R pixel is released at the timing of time t11, and the pixel electronic shutter of the G pixel is released at the timing of time t12. At the timing of time t5, the pixels 201 to 203 connected to the pixel transfer control signal lines (TRG) 172 to 174 are simultaneously read. That is, the pixels 201 and 203 are exposed to light during a period (an exposure period E11) from time t11 to time t15, and the pixel 202 is exposed to light during a period (an exposure period E12) from time t12 to time t15.

As described above, it is possible to generate an exposure period difference between the exposure periods E11 and E12 and offset a CF sensitivity difference in the exposure period. That is, because two exposure control operations are necessary in one line in the horizontal direction when the color-specific shutter is operated, at least two pixel transfer control signal lines (TRG) are necessary.

Even for the pixels 204 to 206, it is possible to generate an exposure period difference between exposure periods E13 and E14 and offset a CF sensitivity difference in the exposure period.

[Timing Chart Example of Control Signals]

FIG. 10 is a timing chart schematically illustrating control signals for pixels constituting the image sensor 100 in accordance with the first embodiment of the present technology. In FIG. 10, the timing chart for operating the color-specific shutter and implementing the SVE zigzag sensitivity pattern in the image sensor 100 illustrated in FIG. 3 is illustrated.

Because FIG. 10 is a modified example of FIG. 9, signal lines common to those of FIG. 9 are denoted by the same reference signs as in FIG. 9 and detailed description thereof is omitted. In addition, in FIG. 10, among the timings illustrated in FIG. 9, the timing of the pixel electronic shutter of the pixel transfer signal line (TRG) 174 is different.

That is, because the pixel transfer signal line (TRG) 174 is connected to a pixel (R pixel) 201, and is provided to a short-time-exposure pixel, control is performed to set an exposure period SE1 shorter than an exposure period LE1 of the long-time-exposure pixel.

For example, at time t21, because the pixel reset control signal line (RST) 171 and the pixel transfer control signal line (TRG) 172 are turned on, the pixel electronic shutter of the pixel (R pixel) 203 is released. In addition, at time t22, because the pixel reset control signal line (RST) 171 and the pixel transfer control signal line (TRG) 173 are turned on, the pixel electronic shutter of the pixel (G pixel) 202 is released.

In addition, at time t24, because the pixel reset control signal line (RST) 171 and the pixel transfer control signal line (TRG) 174 are turned on, the pixel electronic shutter of the pixel (R pixel) 201 is released. That is, the pixel electronic shutter of the R pixel is released at the timings of times t21 and t24, and the pixel electronic shutter of the G pixel is released at the timing of time t22.

At the timing of time t27, the pixels 201 to 203 connected to the pixel transfer control signal lines (TRG) 172 to 174 are simultaneously read. That is, the pixel 203 is exposed to light during a period (the exposure period LE1) from time t21 to time t27, and the pixel 202 is exposed to light during a period (an exposure period LE2) from time t22 to time t27. As described above, an exposure period difference between the exposure periods LE1 and LE2 is generated in the long-time-exposure pixels (R and G pixels). In addition, the pixel 201 is exposed to light during a period (the exposure period SE1) from time t24 to time t27.

As described above, it is possible to generate an exposure period difference between the exposure periods LE1 and LE2 of the long-time-exposure pixels (R and G pixels) and offset a CF sensitivity difference in the exposure period. That is, when the color-specific shutter is operated and the SVE zigzag sensitivity pattern is implemented, it is necessary to control long-time exposure and short-time exposure of the R and B pixels, and at least two pixel transfer control signal lines TRG are necessary. In this case, for the G pixel and the R or B pixel, it is necessary to divide the pixel transfer control signal lines TRG so as to operate the color-specific shutters. Thus, at least three pixel transfer control signal lines are necessary in one line in the horizontal direction.

Even for the pixels 204 to 206, it is possible to generate an exposure period difference between exposure periods SE2 and SE3 of the short-time-exposure pixels (B and G pixels) and offset a CF sensitivity difference in the exposure period.

As described above, in the first embodiment of the present technology, using at least two pixel transfer control signal lines in a first line, some pixels constituting the first line are designated as long-time-exposure pixels (first pixels) and the other pixels constituting the first line are designated as short-time-exposure pixels (second pixels). Likewise, using at least two pixel transfer control signal lines in a second line, some pixels constituting the second line are designated as long-time-exposure pixels (first pixels) and the other pixels constituting the second line are designated as short-time-exposure pixels (second pixels).

In addition, in one line, using at least two pixel transfer control signal lines, the exposure period of the G pixel constituting the long-time-exposure pixels (first pixels) is set to be shorter than that of the R or B pixel constituting the first pixels.

In addition, in one line, using at least two pixel transfer control signal lines, the exposure period of the G pixel constituting the short-time-exposure pixels (second pixels) is set to be shorter than that of the R or B pixel constituting the short-time-exposure pixels (second pixels).

In addition, the first embodiment of the present technology can be recognized as an imaging method of controlling exposure start and end timings of each pixel so that exposure timings of a plurality of pixels constituting one line have at least three patterns using three pixel transfer control signal lines.

As described above, in the first embodiment of the present technology, it is possible to implement the SVE zigzag sensitivity pattern in the CIS by providing three pixel transfer control signal lines TRG on one line in the horizontal direction and controlling these pixel transfer control signal lines TRG. In addition, it is possible to implement the SVE zigzag sensitivity pattern even in the CIS that operates the color-specific shutter for ensuring a CF sensitivity difference. In addition, it is possible to implement the SVE zigzag sensitivity pattern even in a circuit configuration that performs time-division reading. In addition, although there is a certain extent of limitation, a desired pixel sensitivity pattern can be generated by controlling the pixel transfer control signal lines TRG. That is, it is possible to perform appropriate imaging control in accordance with the first embodiment of the present technology.

2. Second Embodiment

In the first embodiment of the present technology, an example in which three pixel transfer control signal lines are provided on one line in the horizontal direction to provide the color-specific shutter mechanism and to implement the SVE zigzag sensitivity pattern has been described. Here, an image sensor in which three pixel transfer control signal lines are necessary is also considered even when no color-specific shutter mechanism is provided. For example, the three pixel transfer control signal lines are necessary in the case of a circuit configuration in which one A/D converter is mounted for two pixels in the vertical direction.

In the second embodiment of the present technology, another example of the image sensor in which the three pixel transfer control signal lines are necessary is shown.

[Configuration Example of Pixel Control Circuit and Pixel Wiring]

Figure 11:
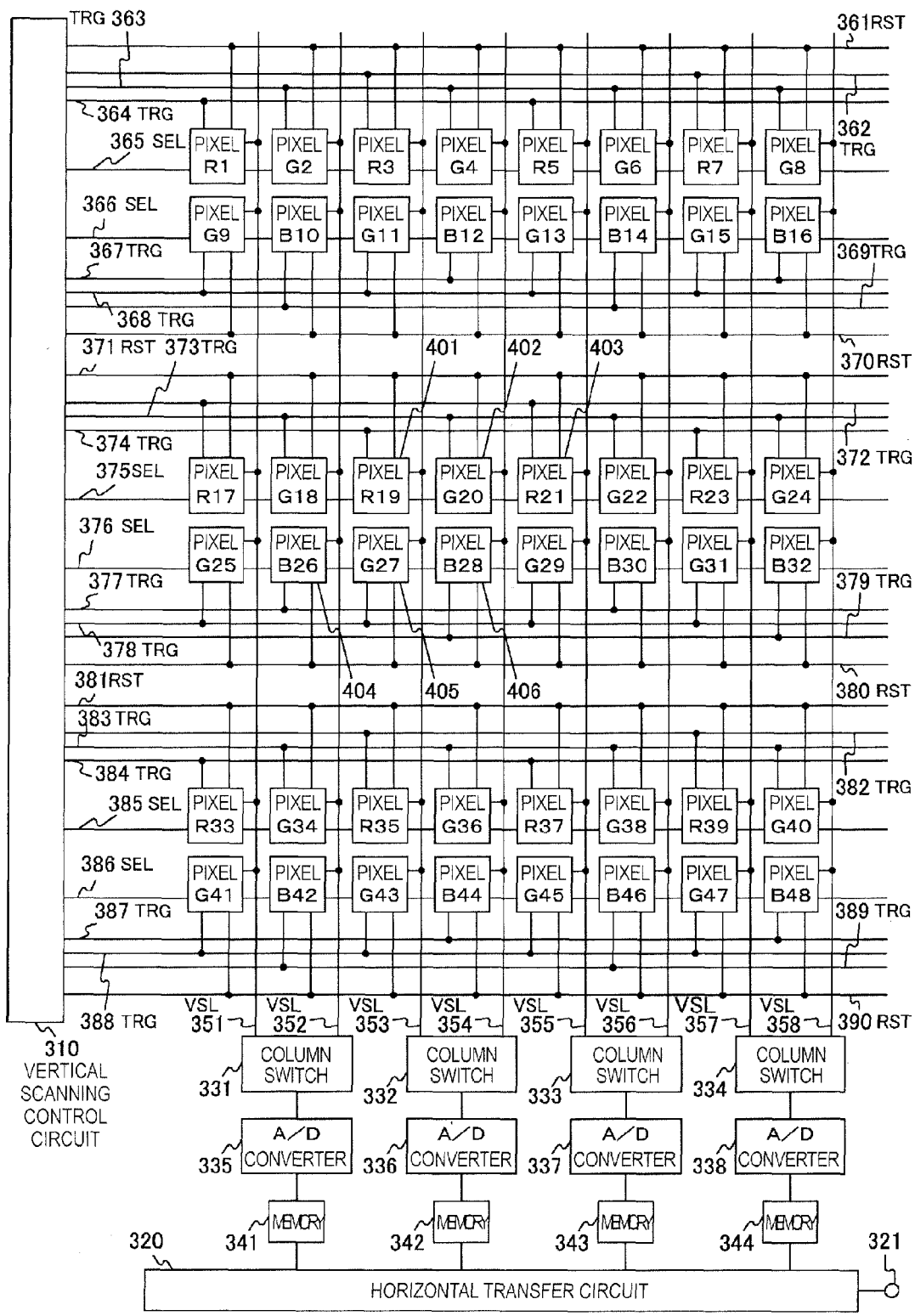
FIG. 11 is a diagram illustrating a configuration example of a pixel control circuit and a pixel wiring of an image sensor 300 in accordance with a second embodiment of the present technology.

FIG. 11 is a diagram illustrating the configuration example of the pixel control circuit and the pixel wiring of an image sensor 300 in accordance with the second embodiment of the present technology. Because the image sensor 300 is a modified example of the image sensor 100 illustrated in FIG. 3, part of description of sections common to the image sensor 100 is omitted.

The image sensor 300 includes a vertical scanning control circuit 310, a horizontal transfer circuit 320, column switches 331 to 334, A/D converters 335 to 338, memories 341 to 344, and a plurality of pixels (pixels R1 to B48). The vertical scanning control circuit 310 corresponds to the vertical scanning control circuit 110 illustrated in FIG. 3, and the horizontal transfer circuit 320 corresponds to the horizontal transfer circuit 120 illustrated in FIG. 3. In addition, the plurality of pixels (pixels R1 to B48) correspond to the plurality of pixels (pixels R1 to B48) illustrated in FIG. 3.

The column switches 331 to 334 select signals from two pixels based on signals from a control section (not illustrated), and output the selected signals to the A/D converters 335 to 338.

The A/D converters 335 to 338 convert image data (analog values) from the column switches 331 to 334 into digital data (digital values).

The memories 341 to 344 sequentially store the digital data converted by the A/D converters 335 to 338.

Here, although the A/D converter (A/D conversion circuit) is generally mounted according to a pixel pitch, the reduction of the A/D converter does not fit into the pixel pitch because of the design constraint according to an influence of pixel size reduction. Thus, as illustrated in FIG. 11, an image sensor in which one A/D converter is mounted in a pitch of two pixels is proposed.

However, because one A/D converter reads from only one pixel once, it is necessary to divide an operation of reading from two pixels into two operations and perform the two operations when one A/D converter is mounted in the two pixels in one line in the horizontal direction.

For example, pixels 401 and 402 are located on the same line in the horizontal direction, and connected to vertical signal lines (VSL) 353 and 354, respectively. In addition, the vertical signal lines (VSL) 353 and 354 are connected to the same A/D converter 336. Thus, it is difficult to simultaneously read from the pixels 401 and 402. For example, it is necessary to shift a reading time of each pixel. For example, it is possible to adopt a method of performing the reading of the pixel 402 after the reading of the pixel 401 has ended. In this case, a time taken for A/D conversion in one line in the horizontal direction is doubled.

Here, the timing of the pixel electronic shutter will be described. Here, for ease of description, reading in a single exposure period instead of SVE reading as the pixel electronic shutter will be described.

In general, when time-division reading is not performed, it is necessary for the exposure period of a pixel of a row of a certain target to be read to be same as the exposure period of a pixel of another row to be read. Thus, the vertical scanning control circuit 310 controls each signal line so that time differences between the read timings of all rows and the timings of the pixel electronic shutters are the same.

In addition, likewise, even when the time-division reading is performed, it is necessary to release the pixel electronic shutter so that exposure periods of the read timing of each pixel and the timing of the pixel electronic shutter are the same. That is, pixels connected to the same A/D converter on the same line in the horizontal direction are read at different read timings. Thus, it is necessary to release the pixel electronic shutter so that exposure periods of the read timing of each pixel and the timing of the pixel electronic shutter are the same.

[Timing Chart Example of Control Signals]

Figure 12:
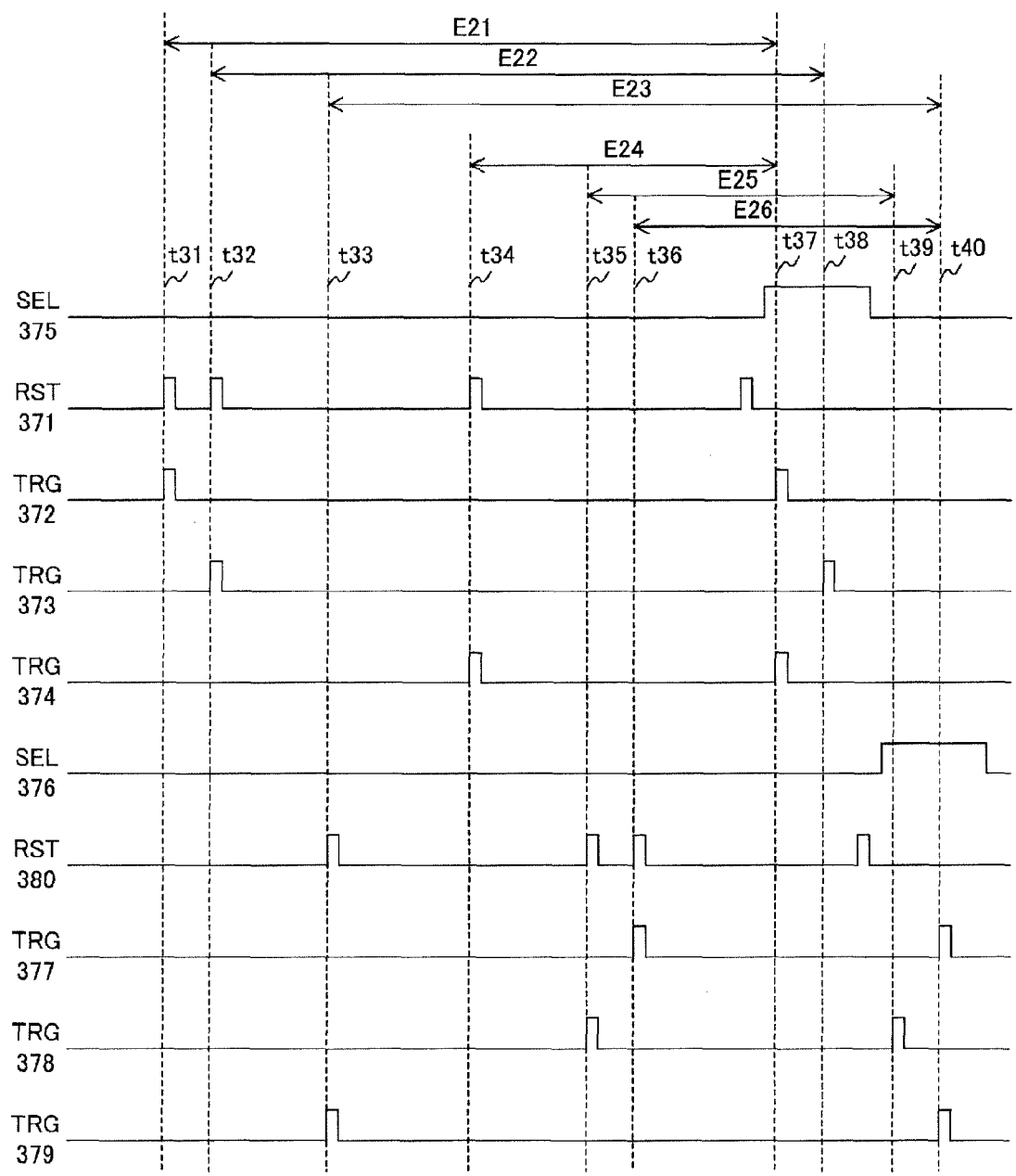
FIG. 12 is a timing chart schematically illustrating control signals for pixels constituting the image sensor 300 in accordance with the second embodiment of the present technology.

FIG. 12 is a timing chart schematically illustrating control signals for pixels constituting the image sensor 300 in accordance with the second embodiment of the present technology. In FIG. 12, the timing chart for implementing the SVE zigzag sensitivity pattern in the image sensor 300 illustrated in FIG. 11 is illustrated. In addition, in FIG. 12, a timing chart corresponding to pixels 401 to 406 among pixels illustrated in FIG. 11 is illustrated.

For example, at time t31, because a pixel reset control signal line (RST) 371 and a pixel transfer control signal line (TRG) 372 are turned on, the pixel electronic shutter of the pixel (R pixel) 403 is released. In addition, at time t32, because the pixel reset control signal line (RST) 371 and a pixel transfer control signal line (TRG) 373 are turned on, the pixel electronic shutter of the pixel (G pixel) 402 is released. That is, because the read timings (times t37 and t38) of the pixels 403 and 402 are shifted, the timings (times t31 and t32) of the pixel electronic shutters of the pixels 403 and 402 are shifted by a difference between the read timings. In addition, the pixel 403 is exposed to light during a period (an exposure period E21) from time t31 to time t37, and the pixel 402 is exposed to light during a period (an exposure period E22) from time t32 to time t38. It is established that Exposure Period E21=E22.

In addition, at time t34, because the pixel reset control signal line (RST) 371 and a pixel transfer control signal line (TRG) 374 are turned on, the pixel electronic shutter of the pixel (R pixel) 401 is released. The pixel (R pixel) 401 is read at time t37. That is, the pixel 401 is exposed to light during a period (an exposure period E24) from time t34 to time t37.

As described above, exposure is controlled at two sensitivities of the long-time-exposure periods E21 and E22 and the short-time-exposure period E24 for implementing the state in which all the pixel electronic shutters of the pixels 401 to 403 on the same line in the horizontal direction are released and the SVE zigzag sensitivity pattern. Thereby, a reading method and pixel electronic shutter control for time-division reading can be performed.

In addition, a pixel electronic shutter operation is performed at time t33, and the pixel 406 is exposed to light during a period (an exposure period E23) from time t33 to time t40. In addition, a pixel electronic shutter operation is performed at time t35, and the pixel 405 is exposed to light during a period (an exposure period E25) from time t35 to time t39. In addition, a pixel electronic shutter operation is performed at time t36, and the pixel 404 is exposed to light during a period (an exposure period E26) from time t36 to time t40. Here, it is established that Exposure Period E21=E22=E23 and Exposure Period E24=E25=E26.

As described above, in the second embodiment of the present technology, at least three pixel transfer control signal lines are provided in one line in the horizontal direction in a circuit configuration in which one A/D converter is mounted in a pitch of two pixels. That is, at least two pixel transfer gate signal lines are necessary for two pixels of one line in the horizontal direction in which reading is performed in one A/D converter because it is necessary to shift the timing at which a gate is turned on during reading. In addition, when the SVE zigzag sensitivity pattern is implemented, it is necessary to divide the pixel transfer control signal lines because it is necessary to vary the exposure period for the adjacent R or B pixels between which the G pixel is interposed on one line in the horizontal direction. As described above, it is possible to implement the SVE zigzag sensitivity pattern in a circuit configuration in which one A/D converter is mounted in a pitch of two pixels by providing at least three pixel transfer control signal lines on one line in the horizontal direction. That is, it is possible to perform appropriate imaging control in accordance with the second embodiment of the present technology.

3. Third Embodiment

In the first and second embodiments of the present technology, an example in which a signal read from each pixel is used without being added has been described. Here, there is also an image sensor that adds and uses a signal read from each pixel.

In the third embodiment of the present technology, an example of an image sensor that adds and uses a signal read from each pixel is shown.

[Arrangement Example of Pixels]

Figure 13:
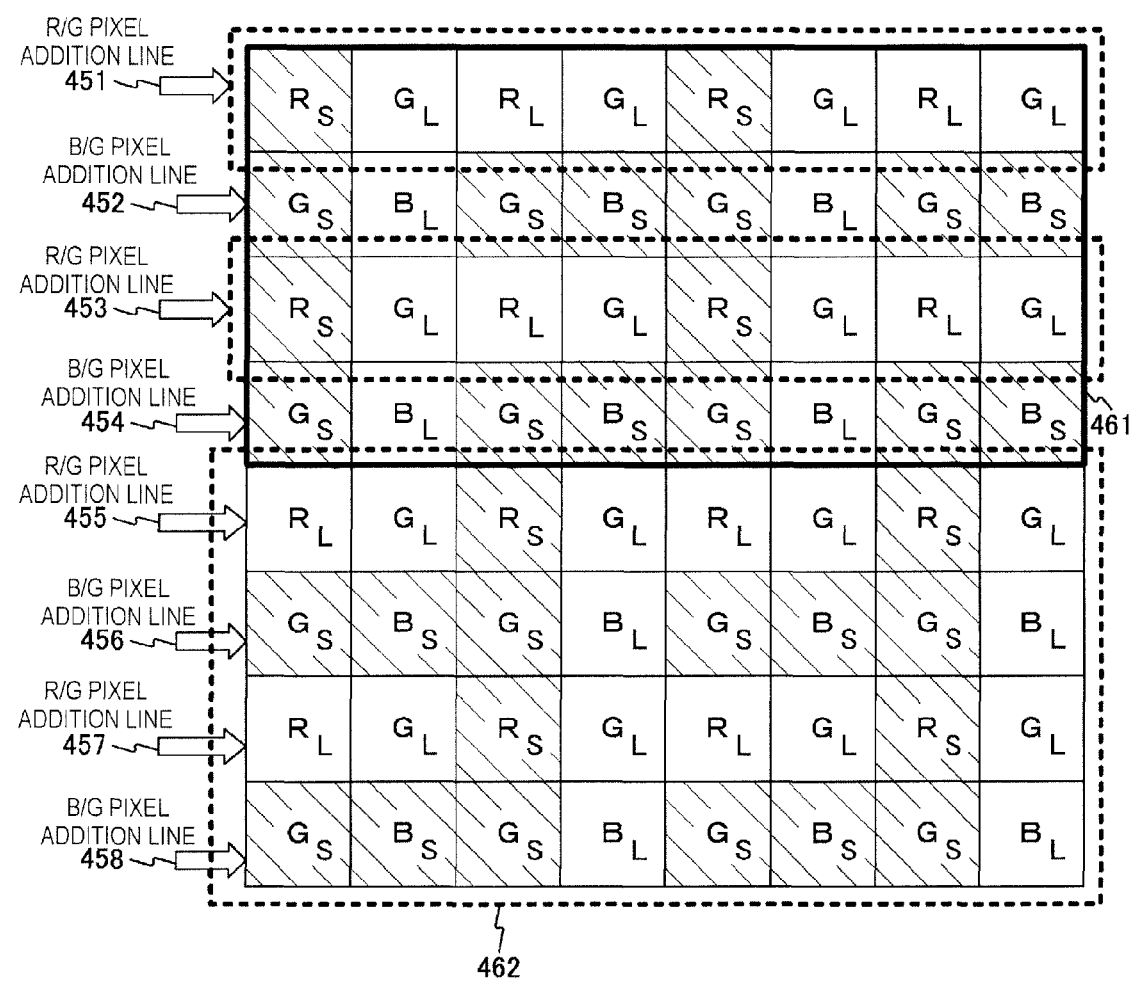
FIG. 13 is a diagram illustrating an example of a pixel arrangement of CFs mounted on a light receiving section of an image sensor 500 in accordance with a third embodiment of the present technology.

FIG. 13 is a diagram illustrating an example of a pixel arrangement of CFs mounted on a light receiving section of an image sensor 500 in accordance with the third embodiment of the present technology. FIG. 13 is a modified example of FIG. 1, and is different from FIG. 1 in that arrangements of the long-time-exposure pixels and the short-time-exposure pixels are switched. However, except for the above point, FIG. 13 is substantially the same as FIG. 1. Thus, parts common to those of FIG. 1 are denoted by the same reference signs as in FIG. 1 and detailed description thereof is omitted.

Figure 14:
FIG. 14 is a diagram illustrating an output example after pixel addition performed on pixels constituting the image sensor 500 in accordance with the third embodiment of the present technology.

In addition, in FIG. 13, an example of a pixel arrangement serving as the SVE zigzag sensitivity pattern illustrated in FIG. 14 after two-pixel addition has been performed is illustrated.

Here, an addition method of obtaining an output added (added and averaged) in the longitudinal direction according to pixel driving and performing addition in a logical calculation in the lateral direction so as to match an aspect ratio of an angle of view after passing through the horizontal transfer circuit is usually used as pixel addition.

In FIG. 13, an example in which a pixel on one line in the horizontal direction and a pixel having the same color as the pixel and separated by two pixels in a downward direction (or two pixels in an upward direction) from the pixel are simultaneously read and reading results are added is illustrated. For example, for pixels (pixels within a dotted rectangular frame) constituting an R/G pixel addition line 451 and pixels (pixels within a dotted rectangular frame) constituting an R/G pixel addition line 453, addition is performed between pixels in the vertical direction (longitudinal direction). Likewise, addition is performed between pixels in the vertical direction for pixels constituting a B/G pixel addition line 452 and pixels constituting a B/G pixel addition line 454. In addition, likewise, addition is performed between pixels in the vertical direction even for R/G pixel addition lines 455 and 457 and B/G pixel addition lines 456 and 458. Two pixels serving as addition targets have the same color and it is necessary to match the exposure periods of the two pixels.

As described above, pixel addition is performed and hence the number of pixels in the longitudinal direction is halved for an output to the horizontal transfer circuit. An arrangement example after the pixel addition is illustrated in FIG. 14.

[Output Example after Pixel Addition]

FIG. 14 is a diagram illustrating an output example after pixel addition performed on pixels constituting the image sensor 500 in accordance with the third embodiment of the present technology. That is, in FIG. 14, an output example after pixels have been added and read for an exposure-controlled sensitivity pattern illustrated in FIG. 13 is illustrated.

Pixels within a thick rectangular frame 471 illustrated in FIG. 14 correspond to outputs of pixel addition performed on pixels within a thick rectangular frame 461 illustrated in FIG. 13. In addition, pixels within a dotted rectangular frame 472 illustrated in FIG. 14 correspond to outputs of pixel addition performed on pixels within a dotted rectangular frame 462 illustrated in FIG. 13.

For example, pixels of an upper-side line within the thick rectangular frame 471 correspond to outputs of pixel addition performed on the pixels constituting the R/G pixel addition line 451 and the pixels constituting the R/G pixel addition line 453 illustrated in FIG. 13. In addition, pixels of a lower-side line within the thick rectangular frame 471 correspond to outputs of pixel addition performed on the pixels constituting the B/G pixel addition line 452 and the pixels constituting the B/G pixel addition line 454 illustrated in FIG. 13.

As illustrated in FIG. 14, a pattern of pixel data after pixel addition has been performed in the arrangement illustrated in FIG. 13 has the same arrangement as the SVE zigzag sensitivity pattern. Thus, because it is possible to use the same signal processing as in the SVE zigzag sensitivity pattern even for a pixel addition operation, it is possible to suppress an increase in a circuit scale.

[Configuration Example of Pixel Circuit Shared by Four Pixels in Longitudinal Direction]

Figure 15:
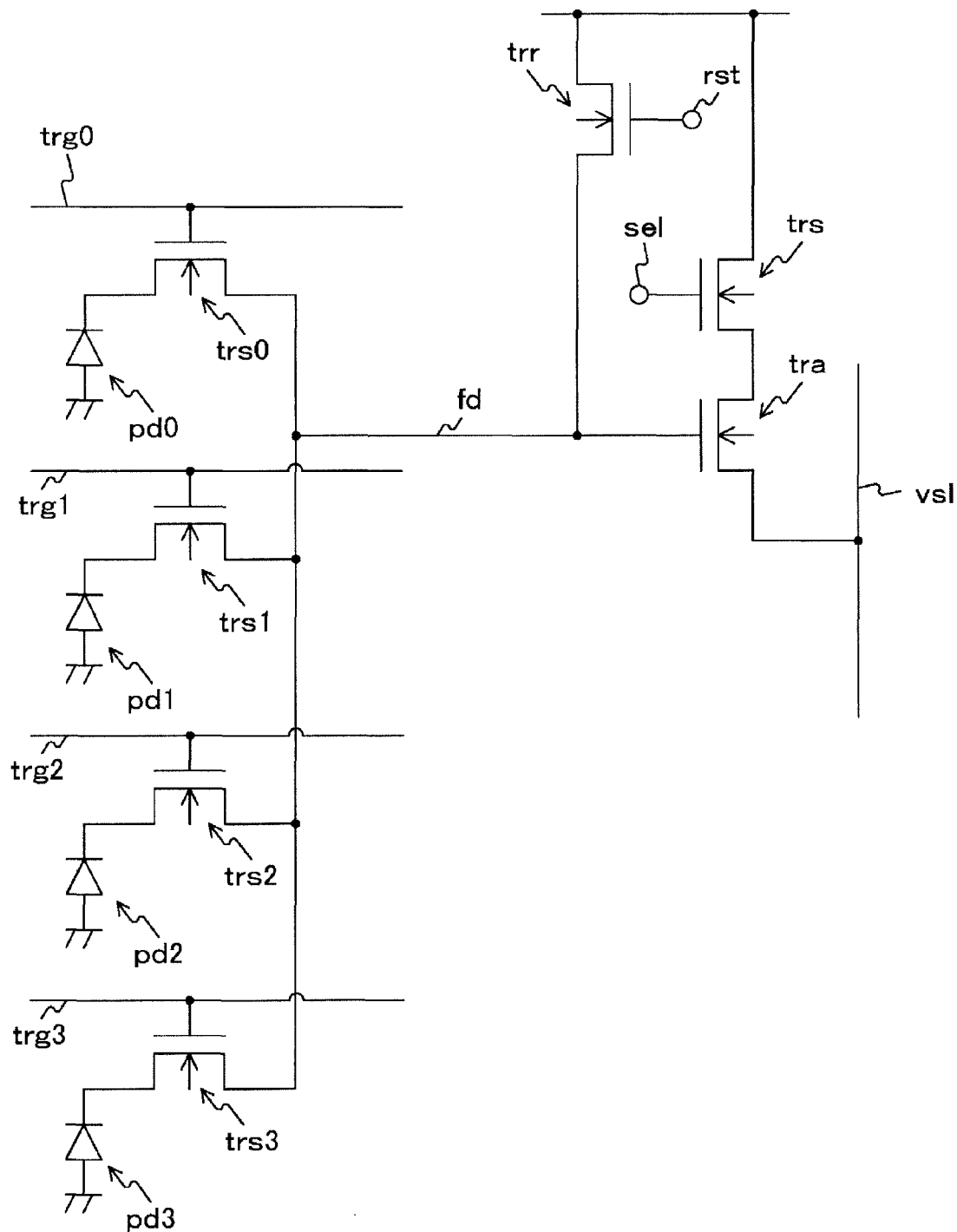
FIG. 15 is a diagram illustrating a configuration example of a basic circuit of a pixel provided in the image sensor 500 in accordance with the third embodiment of the present technology.

FIG. 15 is a diagram illustrating a configuration example of a basic circuit of a pixel provided in the image sensor 500 in accordance with the third embodiment of the present technology. In FIG. 15, a configuration example of a pixel circuit of a CIS shared by four pixels in the longitudinal direction is illustrated.

In FIG. 15, the pixel circuit shared by the four pixels in the longitudinal direction in which pixels pd0 to pd3 continuously arranged in the longitudinal direction are connected to one FD fd via pixel transfer transistors trs0 to trs3 is illustrated. In addition, these pixels are connected to pixel transfer control signal lines trg0 to trg3, a pixel read selection control signal line sel, a vertical signal line (read line) vsl, and a pixel reset control signal line rst.

Because a configuration and operation are substantially the same as those of the pixel circuit illustrated in FIG. 2, except that the pixel circuit is shared by the four pixels in the longitudinal direction, detailed description is omitted here.

[Configuration Example of Pixel Control Circuit and Pixel Wiring]

Figure 16:
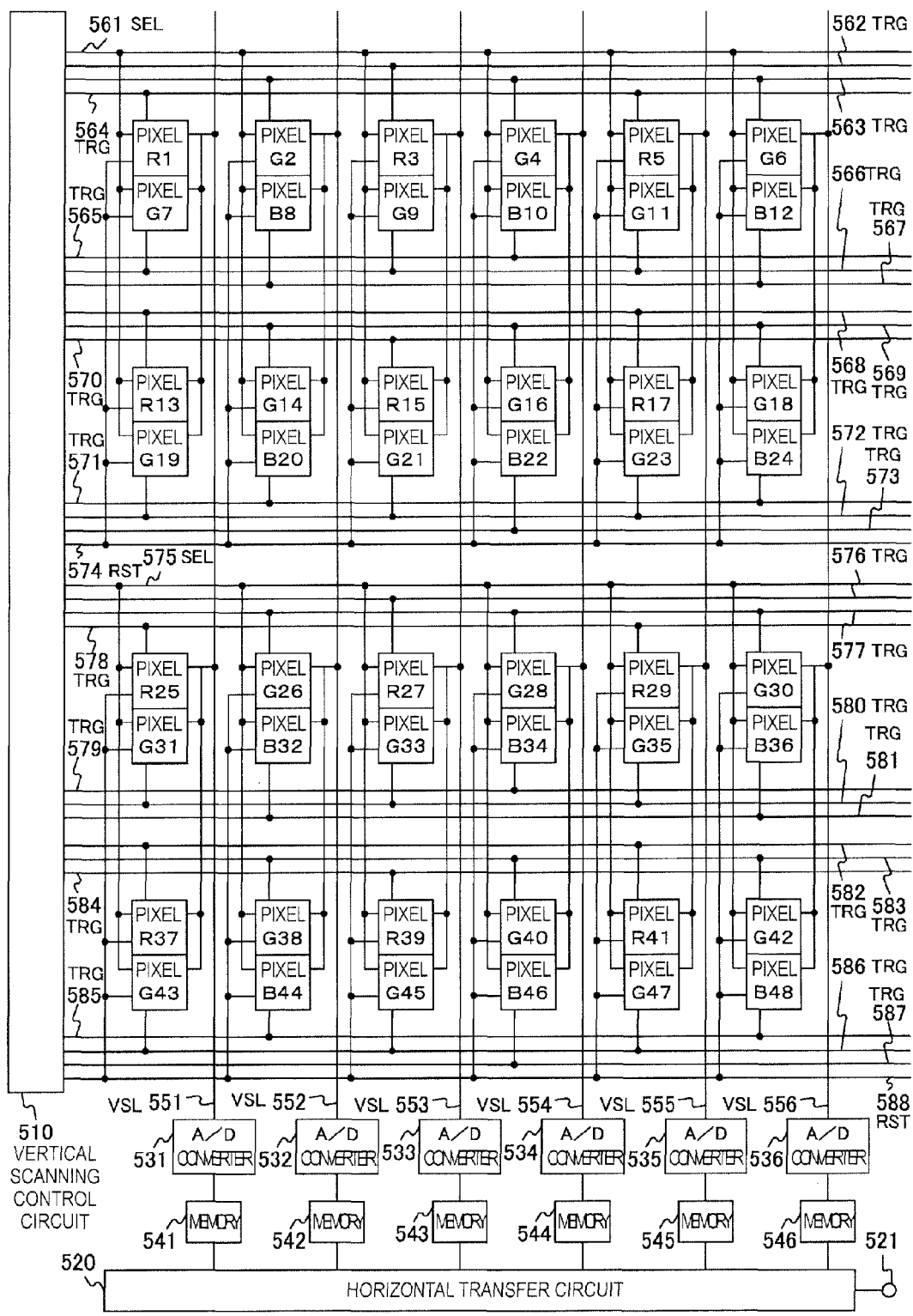
FIG. 16 is a diagram illustrating a configuration example of a pixel control circuit and a pixel wiring of the image sensor 500 in accordance with the third embodiment of the present technology.

FIG. 16 is a diagram illustrating the configuration example of the pixel control circuit and the pixel wiring of the image sensor 500 in accordance with the third embodiment of the present technology. That is, in FIG. 16, an example of an SVE control circuit when a pixel circuit shared by four pixels in the longitudinal direction has been used is illustrated. Because the image sensor 500 is a modified example of the image sensor 100 illustrated in FIG. 3, part of description of sections common to the image sensor 100 is omitted.

Here, although the pixel reset control signal line RST and the pixel read selection control signal line SEL are conveniently connected to each pixel in FIG. 16, a reset operation is performed only when a reset activation signal has been input to a pixel of which the pixel transfer control signal line TRG is activated. In addition, a read operation is performed only on a pixel of which the pixel read selection control signal line SEL and the pixel transfer control signal line TRG have been simultaneously activated.

In addition, the pixel read selection control signal line SEL is connected to the pixel read selection control signal line sel illustrated in FIG. 15, and the pixel reset control signal line RST is connected to the pixel reset control signal line rst.

[Timing Chart Example of Control Signals (Digital Addition)]

Figure 17:
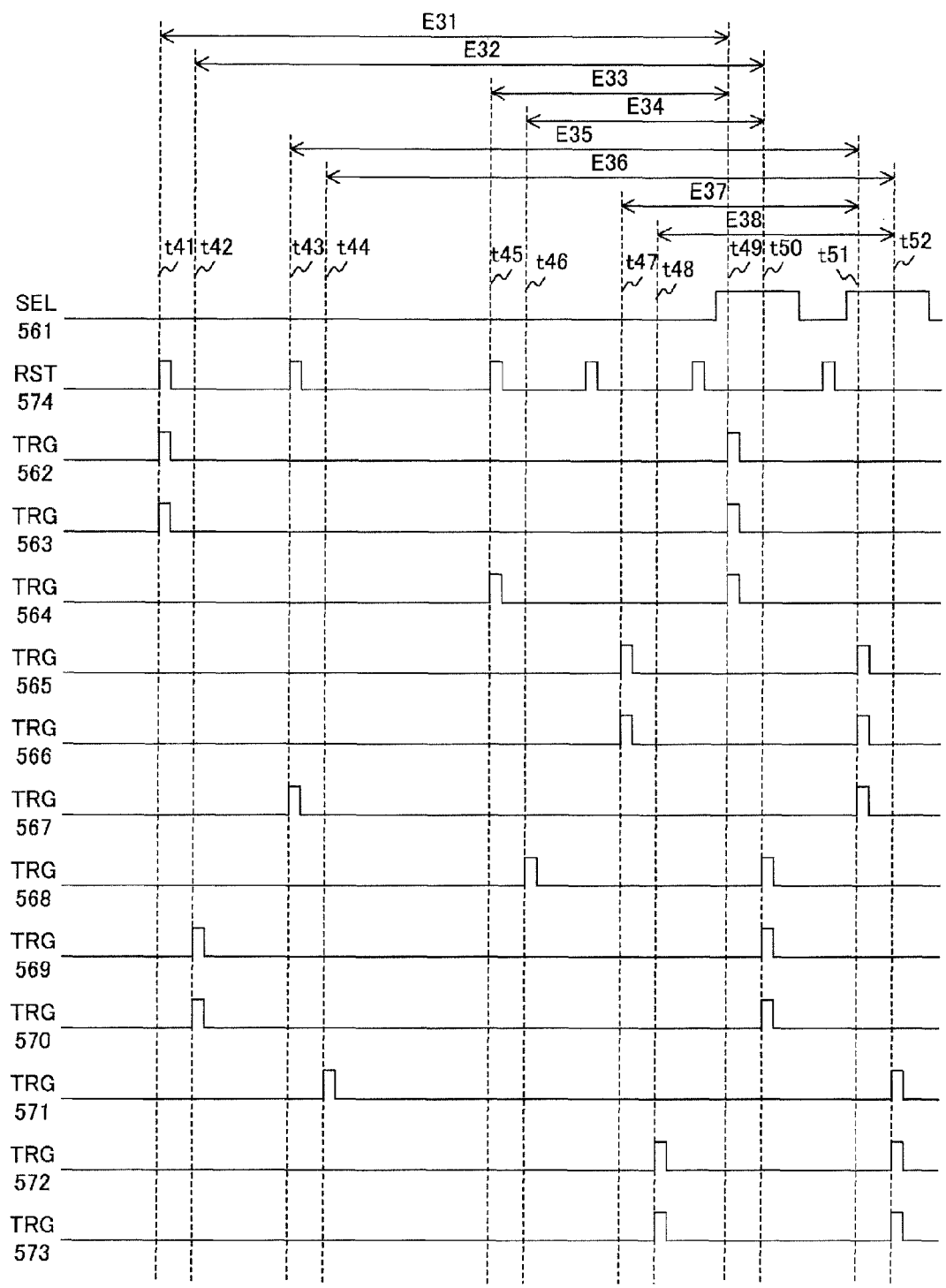
FIG. 17 is a timing chart schematically illustrating control signals for pixels constituting the image sensor 500 in accordance with the third embodiment of the present technology.

FIG. 17 is a timing chart schematically illustrating control signals for pixels constituting the image sensor 500 in accordance with the third embodiment of the present technology. In FIG. 17, the timing chart for implementing the SVE zigzag sensitivity pattern illustrated in FIG. 14 in the image sensor 500 illustrated in FIG. 16 is illustrated. In addition, in FIG. 17, the timing chart when digital addition is used is illustrated. For ease of description, an example in which a color-specific shutter mechanism is not used is illustrated in FIG. 17.

Here, digital addition is a method of performing an addition operation corresponding to two pixels by obtaining an A/D conversion value according to A/D conversion of one pixel of the two pixels that are addition targets and then reading another pixel in addition to the A/D conversion value.

For example, pixels of one line in the horizontal direction connected to pixel transfer control signal lines (TRG) 562 to 564 illustrated in FIG. 16 are simultaneously read at the timing of time t49. After A/D conversion by the A/D converters 531 to 536 has ended for data read as described above, each pixel of one line in the horizontal direction connected to pixel transfer control signal lines (TRG) 568 to 570, which are addition targets, is read at the timing of time t50. At this time, A/D conversion data read at the timing of time t50 is added to A/D conversion data read at the timing of time t49.

Thereafter, the added data is stored in the memories 541 to 546 arranged in columns, and the horizontal transfer circuit 520 transmits the added data to a subsequent-stage calculation circuit (not illustrated).

Here, when the SVE zigzag sensitivity pattern is implemented, it is necessary to control exposure in an exposure period so that an arrangement is provided as illustrated in FIG. 13. Hereinafter, an exposure control example will be described.

In FIG. 17, pixels on which long-time exposure is performed are connected to pixel transfer control signal lines (TRG) 562, 563, 567, 569, 570, and 571. Among these, the pixel transfer control signal lines (TRG) 562 and 563 through which reading is performed at the timing of time t49 are provided, and the exposure period is an exposure period E31.

In addition, it is necessary for the exposure period E32 of pixels (pixels (pixels read at time t50) connected to the pixel transfer control signal lines (TRG) 567 and 570) serving as addition targets to be set to be the same as the exposure period E31. Thus, the pixel electronic shutter is released at the timing of time t42 corresponding to a difference between time t49 and time t50. That is, it is established that Exposure Period E32=E31.

In addition, the pixel electronic shutter is released at the timing of time t45 so that a pixel connected to the pixel transfer control signal line (TRG) 564 arranged on the same line in the horizontal direction as the pixel transfer control signal lines (TRG) 562 and 563 has a short-time-exposure period E33.

In addition, as in control of the long-time exposure, it is necessary for an exposure period E34 of the pixel of the addition target (a pixel connected to the pixel transfer control signal line (TRG) 568 (a pixel read at time t50)) to be set to be the same as the exposure period E33. Thus, the pixel electronic shutter is released at the timing of time t46 corresponding to the difference between time t49 and time t50. That is, it is established that Exposure Period E33=E34.

Likewise, even for B and G pixels connected to pixel transfer control signal lines (TRG) 565 to 567 and pixel transfer control signal lines (TRG) 571 to 573, control is performed so that the relations of Long-Time-Exposure Period E35=E36 and Short-Time-Exposure Period E37=E38 are established. That is, control is performed so that the sensitivity pattern illustrated in FIG. 13 is provided.

[Timing Chart Example (Analog Addition) of Control Signals]

Figure 18:
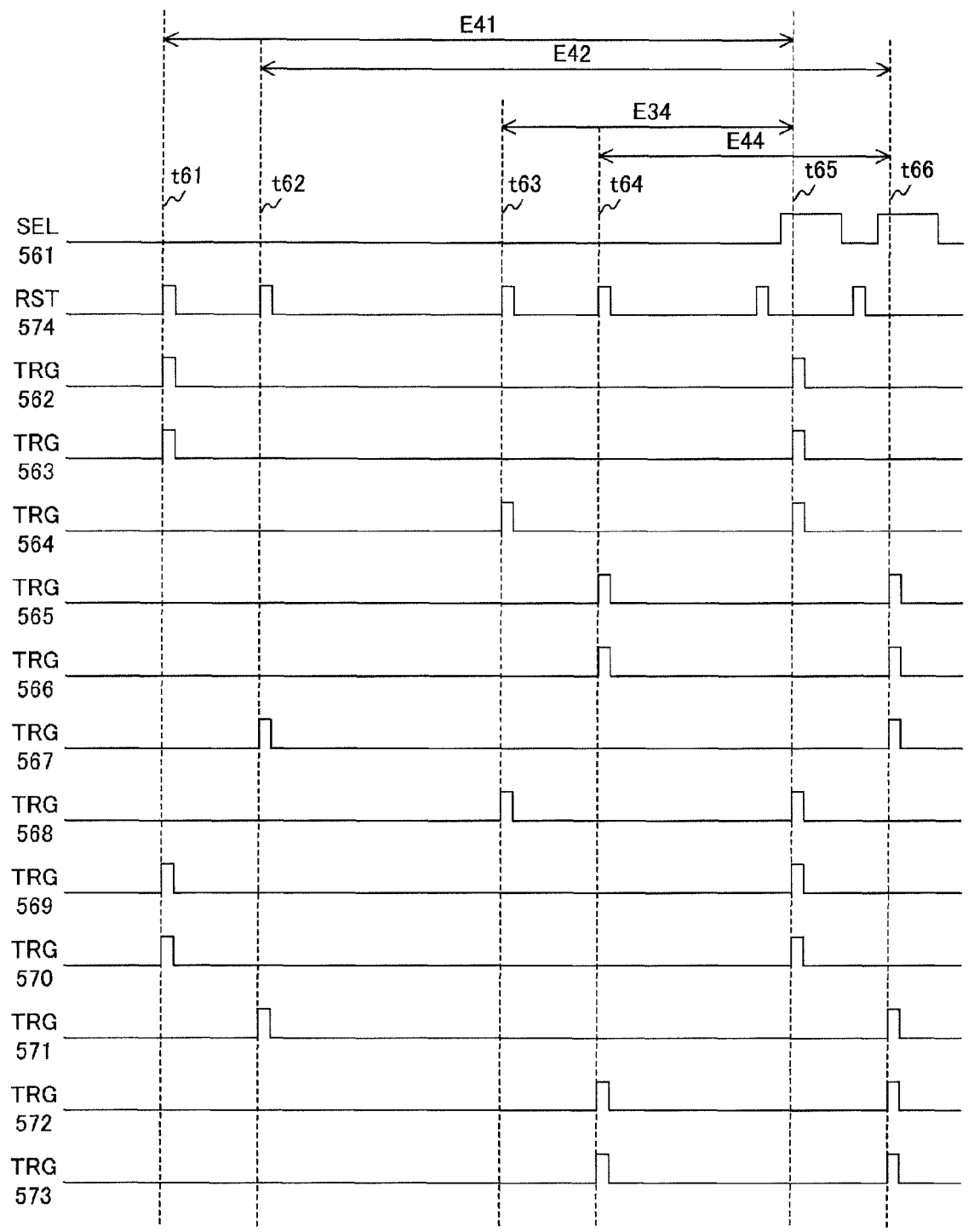
FIG. 18 is a timing chart schematically illustrating control signals for pixels constituting the image sensor 500 in accordance with the third embodiment of the present technology.

FIG. 18 is a timing chart schematically illustrating control signals for pixels constituting the image sensor 500 in accordance with the third embodiment of the present technology. In FIG. 18, the timing chart for implementing the SVE zigzag sensitivity pattern illustrated in FIG. 14 in the image sensor 500 illustrated in FIG. 16 is illustrated. In addition, in FIG. 18, the timing chart when the analog addition is used is illustrated. For ease of description, in FIG. 18, an example in which no color-specific shutter mechanism is used is illustrated.

Here, the analog addition is an addition method that is performed by simultaneously completely transferring charges corresponding to two or more pixels in an operation of transferring charges from a PD to an FD during the read operation. For example, the transfer operations are simultaneously performed on two pixels of the same color in the pixel circuit shared by the four pixels in the longitudinal direction illustrated in FIG. 15 during the read operation.

For example, a pixel R15 to be read simultaneously when analog addition is performed on a pixel R3 connected to the pixel transfer control signal line (TRG) 562 illustrated in FIG. 16 is connected to the pixel transfer control signal line (TRG) 570. Thus, the pixel electronic shutters are simultaneously released at the timing of time t61, and the read operations are simultaneously performed at the timing of time t65.

Likewise, even for the pixel transfer control signal lines (TRG) 563 and 569 connected to pixels G2 and G14 illustrated in FIG. 16, the same control is performed.

In addition, even for the pixel transfer control signal lines (TRG) 564 and 568 connected to pixels R1 and R13 illustrated in FIG. 16, the addition read operations are simultaneously performed at time t65. However, in this case, the pixel electronic shutters are simultaneously released at time t63 at which the exposure period has been shortened to perform SVE control.

In addition, for pixels separated by one pixel in the downward direction from the horizontal line to be read at time t66, at the timing of time t62, the pixel electronic shutters for pixels connected to the pixel transfer control signal lines (TRG) 567 and 571 are released. In this case, the long-time-exposure control in SVE is performed, and the pixel electronic shutters for the other pixels of one line in the horizontal direction are released at the timing of time t64, and the short-time-exposure control in SVE is performed. According to this control, the sensitivity pattern illustrated in FIG. 13 is implemented, and an output of an SVE zigzag sensitivity pixel arrangement as illustrated in FIG. 14 can be obtained for data after addition. Thereby, because the same signal processing as in the SVE zigzag sensitivity pattern can be used, it is possible to suppress an increase in a circuit scale. As described above, it is possible to perform appropriate imaging control according to the third embodiment of the present technology.

As described above, in the third embodiment of the present technology, addition is performed on the same type of pixels in units of lines in the vertical direction for pixels constituting two adjacent first lines in the vertical direction. Addition is performed on the same type of pixels in units of lines in the vertical direction for pixels constituting two adjacent second lines in the vertical direction. Thereby, an arrangement of pixel signals after the addition can have a Bayer arrangement (the SVE zigzag sensitivity pixel arrangement illustrated in FIG. 14).

4. Fourth Embodiment

In the third embodiment of the present technology, an example in which the pixel circuit shared by the four pixels in the longitudinal direction is used has been described. Here, there is also an image sensor that shares four or more pixels.

In the fourth embodiment of the present technology, an example of an image sensor using a pixel circuit shared by eight pixels will be described.

[Configuration Example of Pixel Circuit Shared by Eight Pixels]

Figure 19:
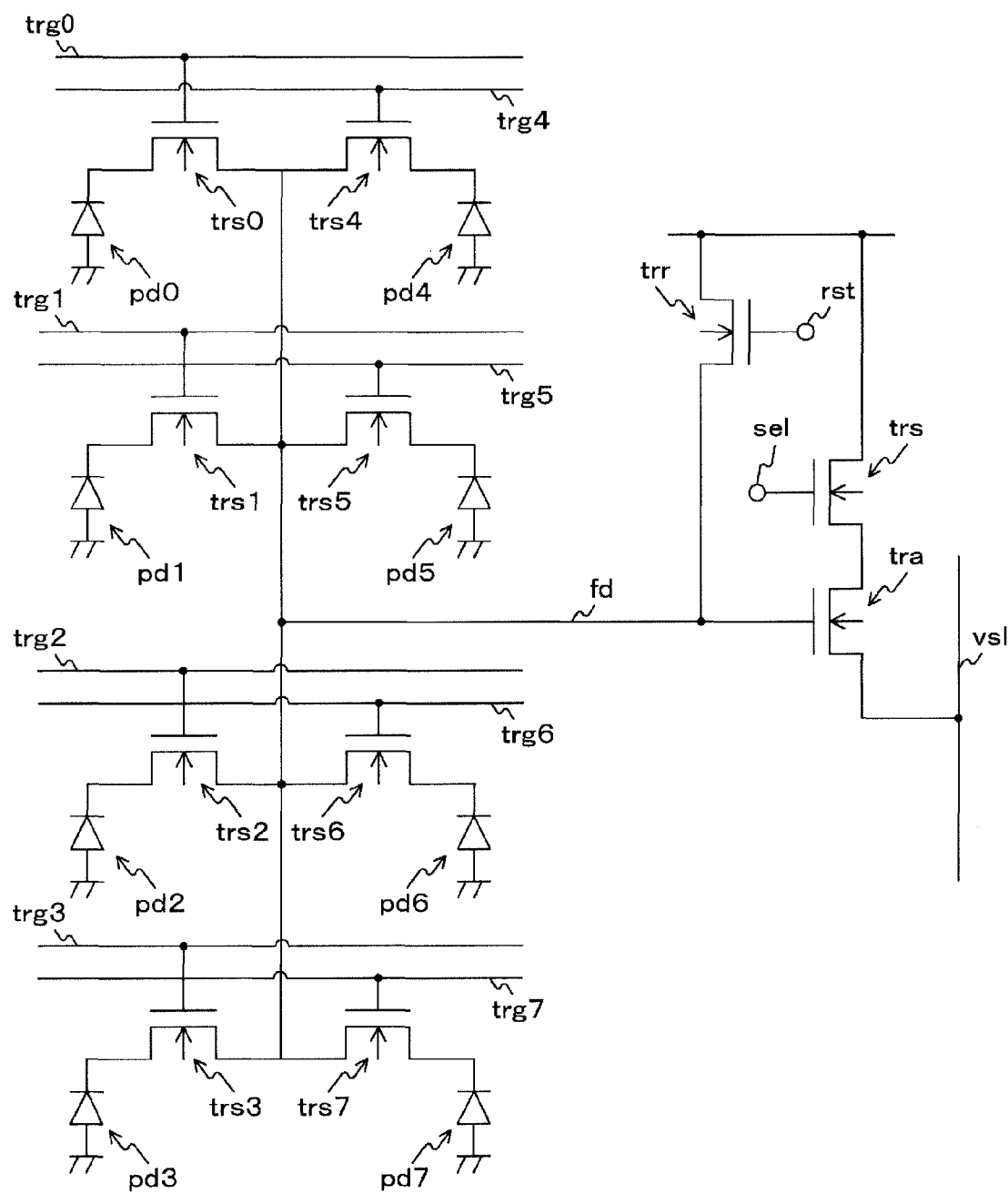
FIG. 19 is a diagram illustrating a configuration example of a basic circuit of a pixel provided in an image sensor 700 in accordance with a fourth embodiment of the present technology.

FIG. 19 is a diagram illustrating a configuration example of a basic circuit of a pixel provided in an image sensor 700 in accordance with the fourth embodiment of the present technology. In FIG. 19, a configuration example of a pixel circuit shared by eight pixels when one FD is shared by four longitudinal pixels and two lateral pixels is illustrated.

As illustrated in FIG. 19, because another column pixel is added to the pixel circuit shared by the four pixels illustrated in FIG. 15, it is necessary to separately provide pixel transfer control signal lines trg4 to trg7 of one line in the horizontal direction. Because a configuration and operation are substantially the same as those of the pixel circuit illustrated in FIG. 15, except that the pixel transfer control signal lines trg4 to trg7 are provided and the pixel circuit is shared by the eight pixels, detailed description is omitted here.

[Configuration Example of Pixel Control Circuit and Pixel Wiring]

Figure 20:
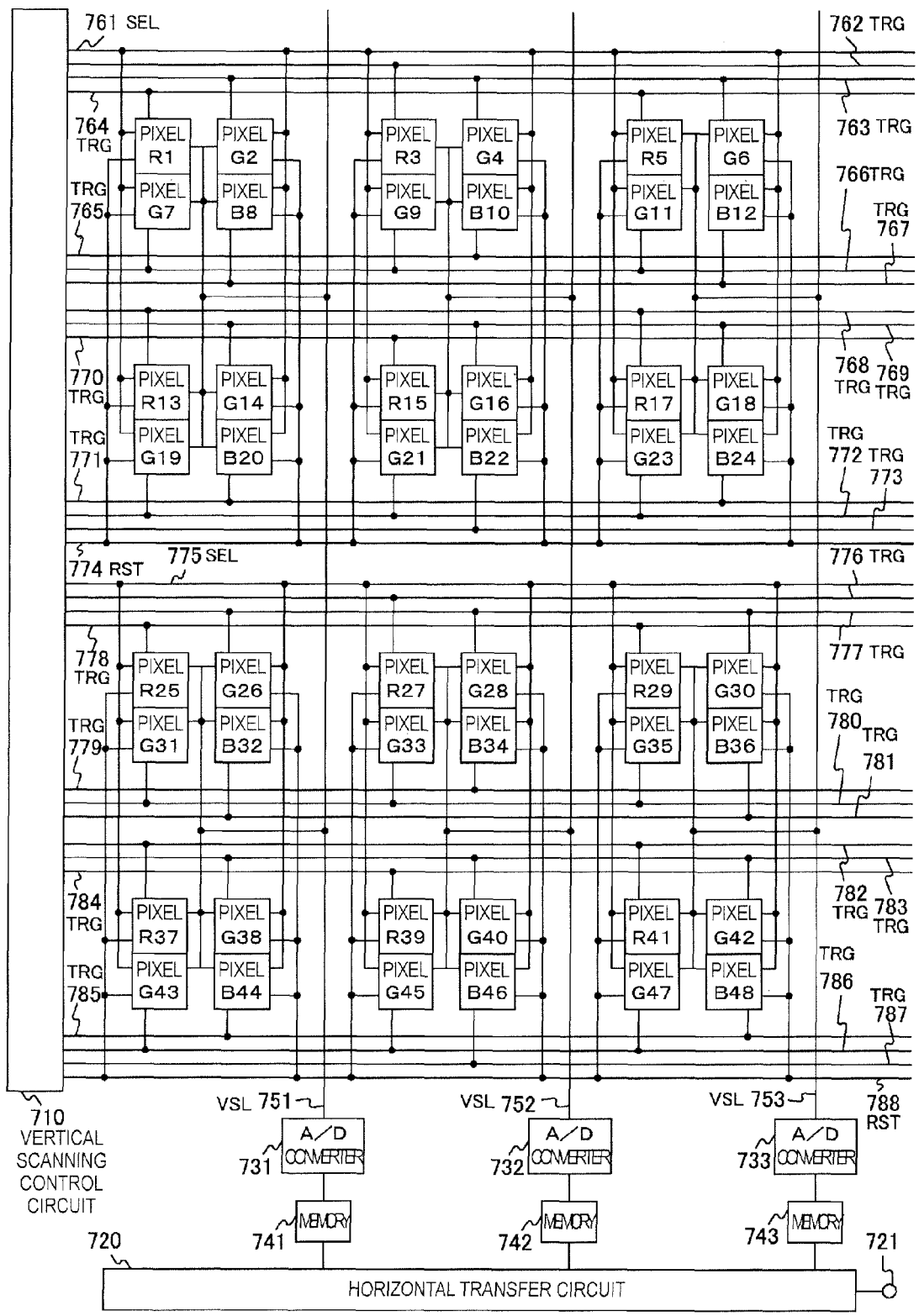
FIG. 20 is a diagram illustrating a configuration example of a pixel control circuit and a pixel wiring of the image sensor 700 in accordance with the fourth embodiment of the present technology.

FIG. 20 is a diagram illustrating the configuration example of the pixel control circuit and the pixel wiring of the image sensor 700 in accordance with the fourth embodiment of the present technology. That is, in FIG. 20, an example of an SVE control circuit when the pixel circuit shared by eight pixels has been used is illustrated. Because the image sensor 700 is a modified example of the image sensor 500 illustrated in FIG. 16, description of sections common to the image sensor 500 is partially omitted.

Here, in the image sensor 700, the number of vertical signal lines VSL is half the number of pixels in the horizontal direction because a pixel circuit is shared by the two pixels in the lateral direction. In addition, because A/D converters 731 to 733 and the memories 741 to 743 are connected one by one for one vertical signal line VSL, time-division reading in which A/D conversion is performed by dividing into odd and even columns in one line in the horizontal direction is performed.

[Timing Chart Example (Analog Addition) of Control Signals]

Figure 21:
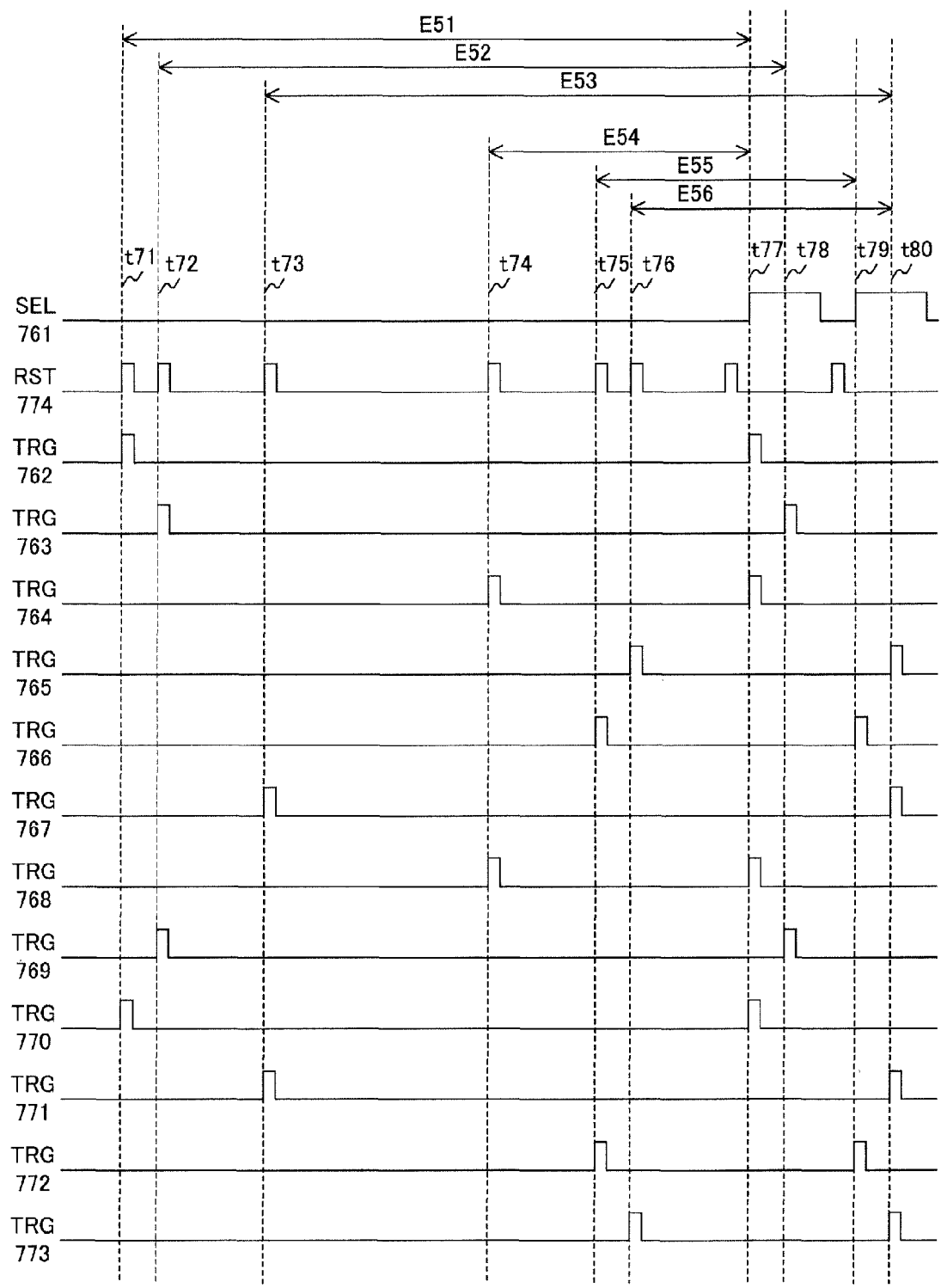
FIG. 21 is a timing chart schematically illustrating control signals for pixels constituting the image sensor 700 in accordance with the fourth embodiment of the present technology.

FIG. 21 is a timing chart schematically illustrating control signals for pixels constituting the image sensor 700 in accordance with the fourth embodiment of the present technology. In FIG. 21, the timing chart for implementing the SVE zigzag sensitivity pattern according to analog addition reading in the image sensor 700 illustrated in FIG. 20 is illustrated. For ease of description, in FIG. 21, an example in which no color-specific shutter mechanism is used is illustrated.

In terms of pixels connected to pixel transfer control signal lines (TRG) 762 to 764, pixels serving as analog addition targets are connected to pixel transfer control signal lines (TRG) 768 to 770.

Here, when analog addition is performed, it is necessary to simultaneously set pixel electronic shutters and read timings of two pixels of the same color within a pixel shared circuit. For example, in terms of an R pixel connected to the pixel transfer control signal line (TRG) 762, a pixel serving as an analog addition target is connected to the pixel transfer control signal line (TRG) 770. Thus, pixel electronic shutters are simultaneously released at the timing of time t71, and read operations are simultaneously performed at the timing of time t77. In this case, long-time exposure is performed as SVE exposure control and an exposure period E51 is provided.

In addition, in terms of a G pixel connected to the pixel transfer control signal line (TRG) 763, a pixel serving as an analog addition target is connected to the pixel transfer control signal line (TRG) 769.

Here, although the same long-time-exposure control as in the R pixel connected to the pixel transfer control signal line (TRG) 762 is performed as the SVE exposure control, it is necessary to perform time-division reading because pixels are adjacent on one line in the horizontal direction. Thus, reading is performed at the timing of time t78.

For example, although pixel electronic shutters of pixels connected to the pixel transfer control signal lines (TRG) 763 and 769 are simultaneously released at the timing of time t72, time t72 is determined so that Exposure Period E52=E51 is established.

In addition, the remaining pixels on the same line in the horizontal direction (a pixel connected to the pixel transfer control signal line (TRG) 764) are controlled in short-time exposure. A pixel serving as an analog addition target is connected to the pixel transfer control signal line (TRG) 768. In addition, because the pixel is the R pixel, reading is performed at the timing of time t77. In addition, for short-time exposure, exposure control of an exposure period E54 shorter than the exposure periods E51 and E52 is performed. Thus, the pixel electronic shutter is released at the timing of time t74.

Next, a pixel row below one pixel will be described. For example, a G pixel connected to the pixel transfer control signal line (TRG) 766 of the pixel transfer control signal lines (TRG) 765 to 767 is read at the timing of time t79. A pixel serving as the analog addition target (a pixel connected to the pixel transfer control signal line (TRG) 772) is also simultaneously read at the timing of time t79. Because these pixels are controlled in short-time exposure in SVE control, the pixel electronic shutters are released at the timing of time t75 so that the same exposure period as the exposure period E54 is provided In addition, it is necessary to perform time-division reading on a pixel which is located in the same line in the horizontal line and is subjected to short-time exposure (a B pixel connected to the pixel transfer control signal line (TRG) 765) and a B pixel connected to a pixel transfer control signal line (TRG) 773 serving as the analog addition target. That is, it is necessary to perform time-division reading by shifting the read timing of the B pixel with respect to a G pixel, and reading is performed at the timing of time t80. In this case, because Exposure Period E56=E55 is established, the pixel electronic shutter is released at the timing of time t76.

In addition, the remaining pixels of the same line in the horizontal direction (a pixel connected to the pixel transfer control signal line (TRG) 767) and a pixel serving as the analog addition target (a pixel connected to a pixel transfer control signal line (TRG) 771) are read at the timing of time t80. In this case, because it is necessary to perform long-time exposure according to SVE control for these pixels, the pixel electronic shutters are released at the timing of time t73 so that Exposure Period E51=E53 is established.

According to the above operation, it is possible to generate an SVE exposure pattern before addition as illustrated in FIG. 13 even in the pixel circuit shared by the eight pixels. That is, it is possible to perform appropriate imaging control according to the fourth embodiment of the present technology.

5. Fifth Embodiment

In the first to fourth embodiments of the present technology, an example in which three pixel transfer control signal lines of each pixel constituting one line in the horizontal direction are provided has been described. As described above, when the three pixel transfer control signal lines are provided, it is important to devise the layout so as to reduce the adverse effect of a load capacity of the pixel transfer control signal line.

In the fifth embodiment of the present technology, an example of the layout for reducing the adverse effect of the load capacity of the pixel transfer control signal line will be described.

[Layout Example of Pixel Transfer Control Signal Line]

Figure 22:
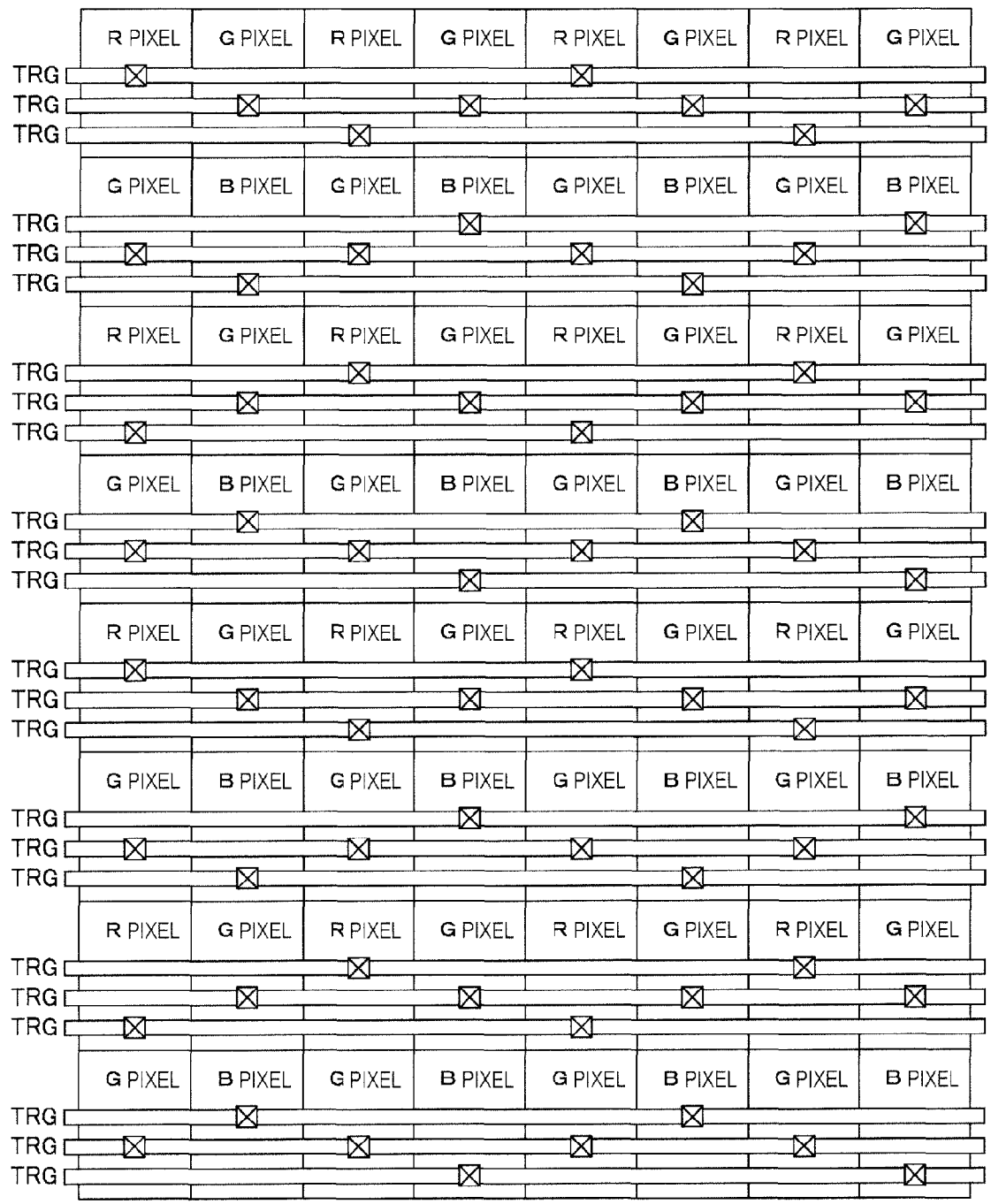
FIG. 22 is a diagram schematically illustrating a layout example of pixels and pixel transfer control signal lines constituting an image sensor in accordance with a fifth embodiment of the present technology.

FIG. 22 is a diagram schematically illustrating a layout example of pixels and pixel transfer control signal lines constituting an image sensor in accordance with the fifth embodiment of the present technology.

In FIG. 22, each pixel is indicated by a rectangle, and a type of each pixel is assigned within the rectangle. In addition, the pixel transfer control signal line TRG is indicated by a long rectangle in the horizontal direction, and a rectangle marked by x in the inside is arranged and shown in a position of a pixel connected thereto.

As illustrated in FIG. 22, in the fifth embodiment of the present technology, the pixel transfer control signal line TRG connected to the G pixel is arranged to be interposed between two pixel transfer control signal lines TRG of the R or B pixel.

For example, the number of pixels connected to each pixel transfer control signal line TRG in the case of the G pixels is twice that in the case of the R or B pixels. Here, if the number of pixels connected to the pixel transfer control signal line TRG is different, a load of its wiring is different and hence its difference is likely to be shown in an image when the image has been developed.

For example, when imaging has been performed in single exposure instead of SVE, control is performed so that two image transfer control signal lines TRG connected to the R pixel are simultaneously turned ON/OFF at the pixel electronic shutter timing and the read timing.

It is possible to make a load such as a line capacity identical to that of the G pixel by arranging one pixel transfer control signal line TRG connected to the G pixel between the two pixel transfer control signal lines TRG connected to the R or B pixel. Thus, it is possible to form a structure in which it is difficult for timing deviation to be caused by a load capacity between identical colors. In addition, appropriate correspondence to control signal lines of the R and B pixels is necessary so that a control signal line and a power ground line are additionally located within the pixel.

For example, it is possible to apply an image sensor (for example, see Japanese Unexamined Patent Application Publication No. 2003-31785) in which a wiring layer forming wirings such as pixel transfer control signal lines is formed on a surface opposite a surface on which pixels are formed. That is, it is possible to provide an image sensor in which a wiring layer forming wirings such as three pixel transfer control signal lines is formed on the surface opposite the surface on which the pixels are formed. In this case, the three pixel transfer control signal lines can be arranged to have the same height as the wiring layer. Thereby, it is possible to provide an image sensor corresponding to pixel size reduction.

As described above, it is possible to reduce shading or the like or reduce an adverse effect of a load capacity of a control signal line by devising the wiring arrangement or the order of physical position. That is, it is possible to perform appropriate imaging control according to the fifth embodiment of the present technology.

6. Application Example

In the first to fifth embodiments of the present technology, examples of image sensors each having at least three pixel transfer control signal lines connected to a plurality of pixels with different exposure timings among a plurality of pixels constituting one line has been described. Hereinafter, an example of an imaging apparatus having each of these image sensors will be described.

[Functional Configuration Example of Imaging Apparatus]

FIG. 23 is a block diagram illustrating a functional configuration example of an imaging apparatus 800 in accordance with an embodiment of the present technology.

The imaging apparatus 800 includes an image sensor 810, an image processing section 820, a recording control section 830, a content storage section 840, a display control section 850, a display section 860, a control section 870, and an operation reception section 880.

The image sensor 810 generates an image signal based on an instruction of the control section 870, and outputs the generated image signal to the image processing section 820. Specifically, the image sensor 810 converts light of an object incident via an optical system (not illustrated) into an electrical signal. The image sensor 810 corresponds to an image sensor shown in each of the first to fifth embodiments of the present technology. In addition, the optical system includes a lens group and a diaphragm, which focuses incident light from the object, and the light focused by the lens group is incident on the image sensor 810 via the diaphragm.

The image processing section 820 performs various image processing on an image signal (digital signal) output from the image sensor 810 based on an instruction of the control section 870. The image processing section 820 outputs the image signal (image data) subjected to various image processing to the recording control section 830 and the display control section 850.

The recording control section 830 performs recording control on the content storage section 840 based on an instruction of the control section 870. For example, the recording control section 830 causes the content storage section 840 to record an image (image data) output from the image processing section 820 as image content (a still-image file or a moving-image file).

The content storage section 840 is a recording medium that stores various information (image content and the like) based on control of the recording control section 830. The content storage section 840 may be embedded in the imaging apparatus 800, and may be attachable to or detachable from the imaging apparatus 800.

The display control section 850 causes the display section 860 to display an image output from the image processing section 820 based on an instruction of the control section 870. For example, the display control section 850 causes the display section 860 to display a display screen for performing various operations related to an imaging operation or an image (so-called through image) generated by the image sensor 810.

The display section 860 is a display panel that displays each image based on control of the display control section 850.

The control section 870 controls each section in the imaging apparatus 800 based on a control program stored in a memory (not illustrated). For example, the control section 870 performs output control (display control) or recording control of an image signal (image data) subjected to image processing by the image processing section 820.

The operation reception section 880 receives an operation performed by a user, and outputs a control signal (operation signal) corresponding to received operation content to the control section 870.

Although an example of the imaging apparatus 800 has been described in this example, it is possible to apply the embodiment of the present technology to electronic device (for example, a portable telephone apparatus in which an imaging section is embedded) having an imaging section with an image sensor.

In addition, an example in which three pixel transfer control signal lines are provided on a per line basis has been described in the embodiment of the present technology. However, four or more pixel transfer control signal lines may be provided on a per line basis and exposure start and end timings of each pixel may be controlled so that the exposure timings have four or more exposure timing patterns.

In addition, although an example in which spectral sensitivities of pixels of the image sensor are three primary colors of RGB has been described in the embodiment of the present technology, a pixel having spectral sensitivity other than the three primary colors of RGB may be used. For example, it is possible to use a pixel having spectral sensitivity of a complementary color system such as yellow (Y), cyan (C), and magenta (M).

Because the above-described embodiment illustrates an example for implementing the present technology, each item described in the embodiment and an item specifying the present technology in the claims have a correspondence relationship. Likewise, the item specifying the present technology in the claims and an item to which the same name is assigned in the embodiment of the present technology have a correspondence relationship. However, the present technology is not limited to the embodiments and may be implemented by applying various modifications to the embodiments in the scope without departing from the subject matter.

Additionally, the present technology may also be configured as below.

(1) An image sensor including:
at least three pixel transfer control signal lines, on a per line basis, configured to control exposure start and end timings of a pixel in order for exposure timings of a plurality of the pixels constituting one line in a specific direction to have at least three patterns.

(2) The image sensor according to (1), wherein a first line on which a pixel of first spectral sensitivity and a pixel of second spectral sensitivity constituting the plurality of pixels are alternately arranged in the specific direction, and a second line on which a pixel of the first spectral sensitivity and a pixel of third spectral sensitivity constituting the plurality of pixels are alternately arranged in the specific direction are alternately arranged in an orthogonal direction orthogonal to the specific direction.

(3) The image sensor according to (2),
wherein, using at least two pixel transfer control signal lines of the pixel transfer control signal lines in the first line, some pixels constituting the first line are designated as first pixels for generating a long-time-exposure image with continuous exposure within a predetermined period, and pixels constituting the first line, which are other than the some pixels, are designated as second pixels for generating a plurality of short-time-exposure images with intermittent exposure within the predetermined period, and
wherein, using at least two pixel transfer control signal lines of the pixel transfer control signal lines in the second line, some pixels constituting the second line are designated as the first pixels and pixels constituting the second line, which are other than the some pixels, are designated as the second pixels.

(4) The image sensor according to (3), wherein, using the pixel transfer control signal lines, a first pixel group in which a predetermined number of pixels in the specific direction and the predetermined number of pixels in the orthogonal direction are connected stepwise is designated as the first pixels, a second pixel group in which the predetermined number of pixels in the specific direction and the predetermined number of pixels in the orthogonal direction are connected stepwise is designated as the second pixels, and the first pixel group and the second pixel group are alternately arranged in the specific direction.

(5) The image sensor according to (3) or (4), wherein, in the one line, using at least two pixel transfer control signal lines of the pixel transfer control signal lines, an exposure period of the pixel of the first spectral sensitivity constituting the first pixels is set to be shorter than an exposure period of the pixel of the second or third spectral sensitivity constituting the first pixels.

(6) The image sensor according to any one of (3) to (5), wherein, in the one line, using at least two pixel transfer control signal lines of the pixel transfer control signal lines, an exposure period of the pixel of the first spectral sensitivity constituting the second pixels is set to be shorter than an exposure period of the pixel of the second or third spectral sensitivity constituting the second pixels.

(7) The image sensor according to any one of (2) to (6), wherein an arrangement of the pixel of the first spectral sensitivity, the pixel of the second spectral sensitivity, and the pixel of the third spectral sensitivity is a Bayer arrangement.

(8) The image sensor according to (2), wherein, by performing addition on a single type of pixels in units of lines in the orthogonal direction on pixels constituting two first lines adjacent in the orthogonal direction and performing addition on a single type of pixels in units of lines of the orthogonal direction on pixels constituting two second lines adjacent in the orthogonal direction, an arrangement of pixel signals after the addition is a Bayer arrangement.

(9) The image sensor according to any one of (2) to (8), wherein, in the one line, at least one pixel transfer control signal line is connected to the pixel of the first spectral sensitivity constituting the plurality of pixels and at least two pixel transfer control signal lines are connected to the pixel of the second or third spectral sensitivity constituting the plurality of pixels.

(10) The image sensor according to (9), wherein the at least one pixel transfer control signal line connected to the pixel of the first spectral sensitivity is arranged between the at least two pixel transfer control signal lines connected to the pixel of the second or third spectral sensitivity.

(11) The image sensor according to any one of (1) to (10), wherein the pixel of the first spectral sensitivity is a green (G) pixel, the pixel of the second spectral sensitivity is a red (R) pixel, and the pixel of the third spectral sensitivity is a blue (B) pixel.

(12) The image sensor according to (1),
wherein the plurality of pixels share one analog/digital (A/D) converter between two adjacent pixels in the specific direction, and
wherein exposure timings of the two adjacent pixels are shifted using at least two pixel transfer control signal lines among the pixel transfer control signal lines.

(13) The image sensor according to (1), wherein a pixel group formed by a plurality of pixels in the specific direction and a plurality of pixels in an orthogonal direction shares one floating diffusion.

(14) An imaging apparatus including:
an image sensor configured to have at least three pixel transfer control signal lines on a per line basis for controlling exposure start and end timings of a pixel in order for exposure timings of a plurality of the pixels constituting one line in a specific direction to have at least three patterns; and an image processing section configured to perform image processing on an image signal output from the image sensor.

(15) An electronic device including:

an image sensor configured to have at least three pixel transfer control signal lines on a per line basis for controlling exposure start and end timings of a pixel in order for exposure timings of a plurality of the pixels constituting one line in a specific direction to have at least three patterns;

an image processing section configured to perform image processing on an image signal output from the image sensor; and a control section configured to control the image signal subjected to the image processing to be output or recorded.

(16) An imaging method including:

controlling exposure start and end timings of a pixel using at least three pixel transfer control signal lines provided on a per line basis in a specific direction in order for exposure timings of a plurality of pixels constituting one line to have at least three patterns.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-003997 filed in the Japan Patent Office on Jan. 12, 2012, the entire content of which is hereby incorporated by reference.

What is claimed is:

1. An image sensor comprising:

a pixel unit including a first pixel group in i th column, a second pixel group in (i+1) th column, a third pixel group in (i+2) th column, a fourth pixel group in (i+3) th column, a fifth pixel group in (i+4) th column, and a sixth pixel group in (i+5) th column; and a plurality of transfer gate control signal lines, wherein each of the first to the sixth pixel groups includes:
 a floating diffusion element;
 a first photoelectric conversion element arranged in a first row;
 a second photoelectric conversion element arranged in a second row;
 a first transfer transistor disposed between the first photoelectric conversion element and the floating diffusion element; and
 a second transfer transistor disposed between the second photoelectric conversion element and the floating diffusion element,
a first transfer gate control signal line of the plurality of transfer gate control signal lines is connected to the first transfer transistor of the first pixel group and the first transfer transistor of the fifth pixel group, and not connected to the first transfer transistor of the second, third, fourth, and sixth pixel groups, and
a second transfer gate control signal line of the plurality of transfer gate control signal lines is connected to the second transfer transistor of the second pixel group and the second transfer transistor of the sixth pixel group, and not connected to the second transfer transistor of the first, third, fourth, and fifth pixel groups.

2. The image sensor of claim 1, wherein a third transfer gate control signal line of the plurality of transfer gate control signal lines is connected to the first transfer transistor of the second, fourth, and sixth pixel groups, and wherein a fourth transfer gate control signal line of the plurality of transfer gate control signal lines is connected to the second transfer transistor of the first, third, and fifth pixel groups.

3. The image sensor of claim 2, wherein a fifth transfer gate control signal line of the plurality of transfer gate control signal lines is connected to the first transfer transistor of the third pixel group, and wherein a sixth transfer gate control signal line of the plurality of transfer gate control signal lines is connected to the second transfer transistor of the fourth pixel group.

* * * * *